US012641403B2

(12) United States Patent
Thubert et al.

(10) Patent No.: US 12,641,403 B2
(45) Date of Patent: *May 26, 2026

(54) MOBILE NODE AWARENESS OF VIRTUAL ACCESS POINTS

(71) Applicant: Cisco Technology, Inc., San Jose, CA (US)

(72) Inventors: Pascal Thubert, Roquefort les Pins (FR); Srinath Gundavelli, San Jose, CA (US); Amine Choukir, Lausanne (CH); Domenico Ficara, Essertines-sur-Yverdon (CH); Jerome Henry, Pittsboro, NC (US); Jean-Philippe Vasseur, Combloux (FR); Patrick Wetterwald, Mouans Sartoux (FR); Eric Levy-Abegnoli, Valbonne (FR)

(73) Assignee: Cisco Technology, Inc., San Jose, CA (US)

( * ) Notice: Subject to any disclaimer, the term of this patent is extended or adjusted under 35 U.S.C. 154(b) by 600 days.

This patent is subject to a terminal disclaimer.

(21) Appl. No.: 18/096,741

(22) Filed: Jan. 13, 2023

(65) Prior Publication Data

US 2023/0171575 A1 Jun. 1, 2023

Related U.S. Application Data

(63) Continuation-in-part of application No. 17/887,706, filed on Aug. 15, 2022, which is a continuation of
(Continued)

(51) Int. Cl.
*H04W 4/70* (2018.01)
*H04W 24/02* (2009.01)
(Continued)

(52) U.S. Cl.
CPC .............. *H04W 4/70* (2018.02); *H04W 24/02* (2013.01); *H04W 48/18* (2013.01); *H04W 88/08* (2013.01); *H04W 88/12* (2013.01)

(58) Field of Classification Search
CPC .............................. H04W 24/02; H04W 48/18
(Continued)

(56) References Cited

U.S. PATENT DOCUMENTS 8,155,081 B1 4/2012 Mater et al.
8,457,084 B2 6/2013 Valmikam
(Continued)

FOREIGN PATENT DOCUMENTS

EP 2995041 A2 3/2016

OTHER PUBLICATIONS

"Virtual Access Point Software for Windows 7", http://www. virtualaccesspoint.com/, Accessed Jan. 4, 2017, 1 page, virtualaccesspoint.com.
(Continued)

*Primary Examiner* — Dang T Ton
(74) *Attorney, Agent, or Firm* — Lee & Hayes, P.C.

(57) ABSTRACT

In one embodiment, a supervisory device in a network notifies, via an access point of the network, a node as to an ability of the network to support virtual access points. The supervisory device receives, in response to notifying the node, information from the node regarding characteristics of the node. The supervisory device selects, based on the characteristics of the node, a plurality of access points in the network to form a virtual access point with which the node may communicate. The supervisory device configures the plurality of access points to function as the virtual access point, wherein the node communicates with the network via the virtual access point.

20 Claims, 26 Drawing Sheets

Related U.S. Application Data application No. 16/820,843, filed on Mar. 17, 2020, now Pat. No. 11,451,945, which is a continuation of application No. 15/499,201, filed on Apr. 27, 2017, now Pat. No. 10,638,287.

(60) Provisional application No. 62/415,387, filed on Oct. 31, 2016.

(51) Int. Cl.
| | |
|---|---|
| *H04W 48/18* | (2009.01) |
| *H04W 88/08* | (2009.01) |
| *H04W 88/12* | (2009.01) |

(58) Field of Classification Search
USPC ................................. 370/329, 401, 402, 403
See application file for complete search history.

(56) References Cited

U.S. PATENT DOCUMENTS

| | | | | |
|---|---|---|---|---|
| 8,532,658 | B2 | 9/2013 | Knisely | |
| 8,755,353 | B2 | 6/2014 | Lu | |
| 8,922,432 | B2 | 12/2014 | Young | |
| 9,066,236 | B2 | 6/2015 | Filippi et al. | |
| 9,087,314 | B2 * | 7/2015 | Hoffman | G05D 1/0297 |
| 9,137,727 | B2 | 9/2015 | Kulkarni | |
| 9,173,183 | B1 | 10/2015 | Ray et al. | |
| 9,210,534 | B1 | 12/2015 | Matthieu et al. | |
| 9,295,022 | B2 | 3/2016 | Bevan et al. | |
| 9,405,591 | B2 | 8/2016 | Bhanage et al. | |
| 9,668,233 | B1 | 5/2017 | Horner et al. | |
| 10,009,280 | B2 | 6/2018 | Weitzman | |
| 10,492,114 | B2 | 11/2019 | Tenny | |
| 10,638,287 | B2 | 4/2020 | Thubert | |
| 11,451,945 | B2 | 9/2022 | Thubert et al. | |
| 2011/0058478 | A1 | 3/2011 | Krym et al. | |
| 2012/0170474 | A1 | 7/2012 | Pekarske | |
| 2013/0136102 | A1 | 5/2013 | Macwan | |
| 2014/0274116 | A1 | 9/2014 | Xu et al. | |
| 2015/0133099 | A1 | 5/2015 | Xu et al. | |
| 2016/0021503 | A1 | 1/2016 | Tapia | |
| 2016/0044593 | A1 | 2/2016 | Anpat et al. | |
| 2016/0072638 | A1 | 3/2016 | Amer et al. | |
| 2016/0081124 | A1 | 3/2016 | Yang | |
| 2016/0112917 | A1 | 4/2016 | Bharghavan et al. | |
| 2016/0315808 | A1 | 10/2016 | Saavedra | |
| 2016/0330077 | A1 | 11/2016 | Jin et al. | |
| 2017/0142684 | A1 | 5/2017 | Bhatt | |
| 2018/0123887 | A1 * | 5/2018 | Thubert | H04L 41/0893 |
| 2023/0318725 | A1 | 10/2023 | Amiri et al. | |

OTHER PUBLICATIONS

"What Is a Virtual Access Point?", SonicOS 6.2—Administration Guide, https://documents.software.dell.com/sonicos/6.2/administrationguide/sonicpoint/configuring-virtual-access-points/sonicpoint-virtual-access-point/sonicpoint-vap-overview/what-is-a-virtual-access-point, 1 page, Aug. 26, 2016, Quest Software Inc.

"LoRa Alliance™ Technology", https://www.lora-alliance.org/What-Is-LoRa/Technology, Accessed Jan. 4, 2017, 2 pages, LoRa Alliance.

"VirtualAPs", ArubaOS—Chapter 5, http://www.arubanetworks.com/techdocs/ArubaOS_61/ArubaOS_61_UG/VirtualAPs.php, Accessed Jan. 4, 2017, Arubanetworks.com.

Home—The Things Network Wiki; <https://www.thethingsnetwork.org/wiki/LoRaWAN/Homepages>; pp. 1-15.

https://en.wikipedia.org/wiki/IEEE 802.11r-2008; IEEE 802.11r-2008—Wikipedia; pp. 1-2.

* cited by examiner

930

922

920

922

MOBILE NODE AWARENESS OF VIRTUAL ACCESS POINTS

RELATED APPLICATION

This application is a continuation-in-part of U.S. patent application Ser. No. 17/887,706, filed on Aug. 15, 2022, U.S. patent application Ser. No. 16/820,843, filed on Mar. 17, 2020, and U.S. patent application Ser. No. 15/499,201, filed on Apr. 27, 2017, all of which claim priority to U.S. Provisional Patent Appl. No. 62/415,387, filed on Oct. 31, 2016 and entitled "TRANSPARENT ROAMING IN VIRTUAL ACCESS POINT (VAP) ENABLED NETWORKS," by Thubert, et al., the entire contents of which are incorporated herein by reference.

TECHNICAL FIELD

The present disclosure relates generally to computer networks, and, more particularly, to transparent roaming in virtual access point (VAP) enabled networks.

BACKGROUND

The Internet of Things (IoT) is the internetworking of devices or objects (a.k.a., "things", e.g., sensors, actuators, nodes, vehicles, etc.) that collect and exchange data, control objects, and process data. Many IoT networks are formed on low-power lossy networks (LLNs), and utilize carrier sense multiple access with collision avoidance (CSMA/CA) techniques. CSMA/CA, notably, is a communication technique that uses carrier sensing, where nodes attempt to avoid collisions by transmitting only when the channel is sensed to be "idle."

In general, deterministic routing concerns ensuring that messages (e.g., packets) definitively arrive at a destination at a specific time or within a specified time range. However, implementing determinism in hub-and-spoke IoT models, particularly with CSMA/CA, faces a litany of drawbacks, such as overwhelming a server with multiple copies of traffic, excessive delay, surges in latency, and unacceptable frame loss.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
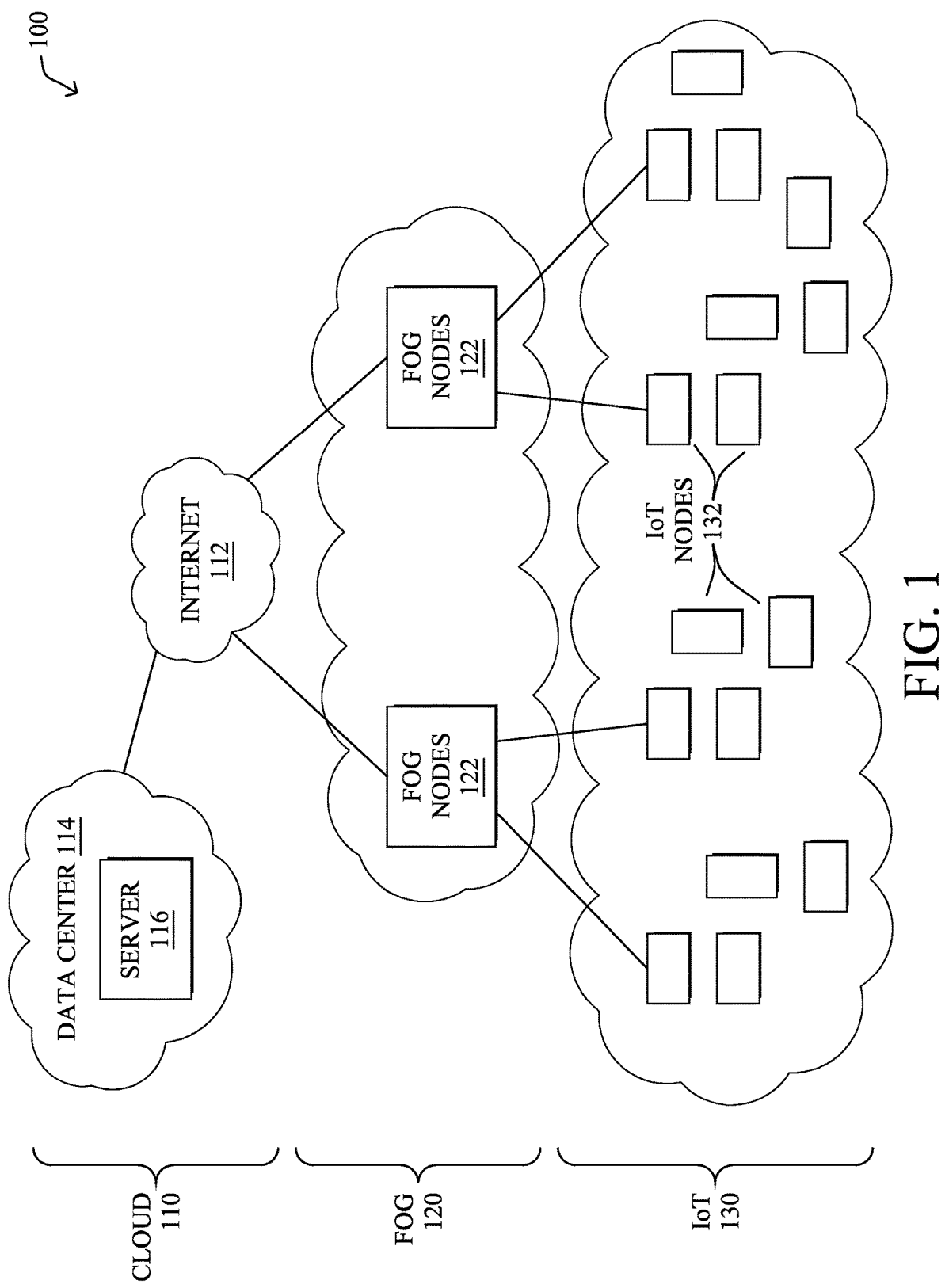
FIG. 1 illustrates an example communication network.

According to one or more embodiments of the disclosure, a supervisory device in a network notifies, via an access point of the network, a node as to an ability of the network to support virtual access points. The supervisory device receives, in response to notifying the node, information from the node regarding characteristics of the node. The supervisory device selects, based on the characteristics of the node, a plurality of access points in the network to form a virtual access point with which the node may communicate. The supervisory device configures the plurality of access points to function as the virtual access point, wherein the node communicates with the network via the virtual access point.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or PLC networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Edge computing is a distributed approach of cloud implementation that acts as an intermediate layer from local networks (e.g., IoT networks) to the cloud (e.g., centralized and/or shared resources, as will be understood by those skilled in the art). That is, generally, edge computing entails using devices at the network edge to provide application services, including computation, networking, and storage, to the local nodes in the network, in contrast to cloud-based approaches that rely on remote data centers/cloud environments for the services. To this end, an edge node is a functional node that is deployed close to edge endpoints to provide computing, storage, and networking resources and services. Multiple edge nodes organized or configured together form an edge system, to implement a particular solution. Edge nodes and edge systems can have the same or complementary capabilities, in various implementations. That is, each individual edge node does not have to implement the entire spectrum of capabilities. Instead, the edge capabilities may be distributed across multiple edge nodes and systems, which may collaborate to help each other to provide the desired services. In other words, an edge system can include any number of virtualized services and/or data stores that are spread across the distributed edge nodes. This may include a master-slave configuration, publish-subscribe configuration, or peer-to-peer configuration.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid advanced metering infrastructure (AMI), smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

FIG. 1 is a schematic block diagram of an example simplified computer network 100 illustratively comprising nodes/devices at various levels of the network, interconnected by various methods of communication. For instance, the links may be wired links or shared media (e.g., wireless links, PLC links, etc.) where certain nodes, such as, e.g., routers, sensors, computers, etc., may be in communication with other devices, e.g., based on connectivity, distance, signal strength, current operational status, location, etc.

Specifically, as shown in the example network 100, three illustrative layers are shown, namely cloud layer 110, edge layer 120, and IoT device layer 130. Illustratively, cloud layer 110 may comprise general connectivity via the Internet 112, and may contain one or more datacenters 114 with one or more centralized servers 116 or other devices, as will be appreciated by those skilled in the art. Within edge layer 120, various edge nodes/devices 122 (e.g., with edge modules, described below) may execute various edge computing resources on network edge devices, as opposed to datacenter/cloud-based servers or on the endpoint nodes 132 themselves of the IoT layer 130. Data packets (e.g., traffic and/or messages sent between the devices/nodes) may be exchanged among the nodes/devices of the computer network 100 using predefined network communication protocols such as certain known wired protocols, wireless protocols, PLC protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Data packets (e.g., traffic and/or messages) may be exchanged among the nodes/devices of the computer network 100 using predefined network communication protocols such as certain known wired protocols, wireless protocols (e.g., IEEE Std. 802.15.4, Wi-Fi, Bluetooth®, DECT-Ultra Low Energy, LoRa, etc.), PLC protocols, or other shared-media protocols where appropriate. In this context, a protocol consists of a set of rules defining how the nodes interact with each other.

Figure 2:
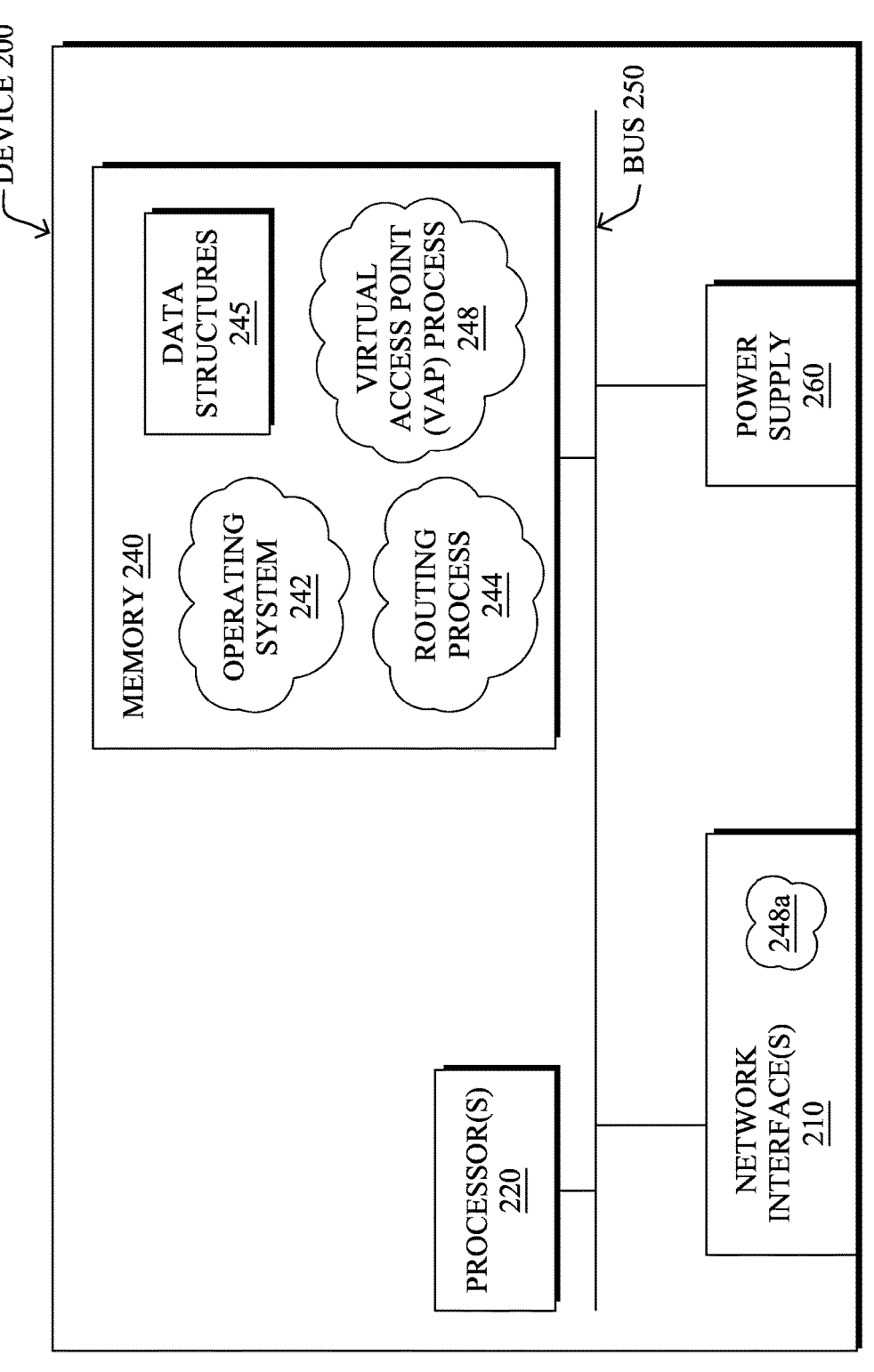
FIG. 2 illustrates an example network device/node.

FIG. 2 is a schematic block diagram of an example node/device 200 that may be used with one or more embodiments described herein, e.g., as any of the nodes or devices shown in FIG. 1 above or described in further detail below. The device 200 may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 include the mechanical, electrical, and signaling circuitry for communicating data over links 105 coupled to the network 100. The network interfaces may be configured to transmit and/or receive data using a variety of different communication protocols. Note, further, that the nodes may have two different types of network connections, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. Operating system 242, portions of which is typically resident in memory 240 and executed by the processor, functionally organizes the device by, inter alia, invoking operations in support of software processes and/or services executing on the device. These software processes and/or services may comprise routing process 244 and an illustrative virtual access point (VAP) process 248, as described herein. Note that while VAP process 248 is shown in centralized memory 240, alternative embodiments provide for the process to be specifically operated within the network interfaces 210, such as a component of a MAC layer (e.g., process 248a).

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

In general, VAP process 248 includes computer executable instructions that, when executed by processor(s) 220, cause device 200 to perform operations regarding the formation, adjustment, and operation of a VAP within the network. These operations are described in greater detail below. In some embodiments, process 248 may employ any number of machine learning techniques, to perform these operations. In general, machine learning is concerned with the design and the development of techniques that receive empirical data as input (e.g., data regarding the performance/characteristics of the network) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function is a function of the number of misclassified points. The learning process then operates by adjusting the parameters a,b,c such that the number of misclassified points is minimal. After this optimization/learning phase, process 248 can use the model M to classify new data points, such as information regarding the performance/characteristics associated with an established VAP or its underlying APs, to adjust the VAP, accordingly. Often, M is a statistical model, and the cost function is inversely proportional to the likelihood of M, given the input data.

In various embodiments, VAP process 248 may employ one or more supervised, unsupervised, or semi-supervised machine learning models to analyze traffic flow data. Generally, supervised learning entails the use of a training dataset, which is used to train the model to apply labels to the input data. For example, the training data may include sample network data that may be labeled simply as representative of a "good connection" or a "bad connection." On the other end of the spectrum are unsupervised techniques that do not require a training set of labels. Notably, while a supervised learning model may look for previously seen network data that has been labeled accordingly, an unsupervised model may instead look to whether there are sudden changes in the performance of the network and/or the VAP. Semi-supervised learning models take a middle ground approach that uses a greatly reduced set of labeled training data.

Example machine learning techniques that process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of times the model incorrectly labeled a connection as bad. Conversely, the false negatives of the model may refer to the number of connections that the model labels as 'good,' but are, in fact, of poor quality to the user or endpoint node. True negatives and positives may refer to the number of times the model correctly classifies a connection as good or bad, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives. In some cases, process 248 may also use reinforcement learning techniques which generally act to use feedback about the ML predictions, to adjust the underlying model. For example, an indication of a false positive from an expert (e.g., a supervisory system or user) may be used to adjust the underlying model, to avoid such predictive mistakes in the future.

As mentioned above, various protocols have been established for the IoT, including, in particular, various "hub-and-spoke" models, such as Bluetooth Low Energy, DECT-Ultra Low Energy, IEEE 802.15.4 (with no meshing), and Low Power Wi-Fi. However, there is also a lack of determinism in these models due to prevalent use of carrier sense multiple access with collision avoidance (CSMA/CA) for wireless communications. Notably, deterministic networking requires that the worst-case data loss and latency should be guaranteed in a consistent fashion as multiple services are deployed on a common converged network infrastructure. This determinism is key to many applications, such as safety and process control. To complicate matters further, considering the vast amounts of devices that are currently being installed in various IoT networks, an important constraint to be placed on any solution is that changes at the end device (e.g., IoT device/thing) should not be necessary. This would also enable connection of legacy devices, thereby addressing a much wider market of applicability.

Virtual Access Point (VAP) Formation

The techniques herein introduce a methodology that can be used with existing IoT infrastructure to implement a virtual access point (VAP) that is unique to a given IoT node. In general, the VAP is a logical entity that appears to the endpoint node as a normal AP to which the node associates as normal. In practice, however, the VAP is physically distributed over a number of APs surrounding the device. In another aspect, a supervisory device in the network may control the AP membership in the VAP, such as by transferring AP membership in the network while the node moves and without requiring the node to roam. In further aspects, a machine learning model of the supervisory device may oversee the VAP and adjust the VAP mapping, accordingly. Such a machine learning model may reside in the supervisory device (e.g., controller, cloud service, etc.) in a centralized mode, or in a distributed manner across the APs. Depending on the traffic criticality, more or less of those APs may copy a given frame received from the endpoint node to the supervisory device.

Illustratively, the techniques described herein may be performed by hardware, software, and/or firmware, such as in accordance with virtual access point process 248, which may include computer executable instructions executed by processor 220 (or independent processor of interfaces 210) to perform functions relating to the techniques described herein. In particular, VAP process 248 may be a component of an IoT device, a cloud device, or any other participating device for the techniques described herein.

Specifically, according to one or more embodiments of the disclosure, a supervisory device in a network receives from a plurality of APs in the network data regarding a network availability request broadcast by a node seeking to access the network and received by the APs in the plurality. The supervisory device uniquely associates the node with a VAP for the node and forms a VAP mapping between the VAP for the node and a set of the APs in the plurality selected based on the received data regarding the network availability request. One of the APs in the mapping is designated as a primary access point for the node. The supervisory device instructs the primary AP to send a network availability response to the node that includes information for the VAP. The node uses the information for the VAP to access the network via the set of APs in the VAP mapping.

Operationally, the techniques herein specify an architecture and protocol between a supervisory device in a network (e.g., a controller, such as a network server) and a plurality of network access points (APs). The supervisory device may be configured for use with any of the technologies, noted above. Note that the techniques herein illustratively place a number of functions in the supervisory device, such as components hosting Machine Learning (ML) processes, also referred to as "learning machines") that are mostly technology-independent. In some embodiments, these processes may be implemented in a distributed manner (e.g., across different APs), in which case the collective set of APs may be viewed as the supervisory device.

More specifically, the techniques herein enable the formation and use of a VAP that appears to always be "near" an endpoint node, so that quality of transmission and PHY speed can be maintained. A VAP may be instantiated within a set of APs around the node, and the set may vary automatically under the control of the supervisory device (e.g., a controller hosting a machine learning model) within the infrastructure. Thus, the device never needs to make a decision of roaming, which is a paradigm change in Wi-Fi and other wireless networks. Also, since multiple APs can receive a same packet at a same time with unrelated probabilities, the overall chances of reception are increased and delays related to retries are reduced, thus helping with determinism.

Generally, a VAP may include any number of physical APs in the network that are placed in groups of equivalence, all using the same channel(s) and security settings. When a node (e.g., a STA) associates with the network, the supervisory device (e.g., controller) may select a set of APs that together form a VAP for the associated node. The set may be changed as the node moves. In this way, the endpoint node may experience a constant service from the network and does not roam. For joining, the node may interact with one of the APs (e.g., a primary networking AP) and may use a unique network identifier associated with the VAP, such as a unique service set identifier (SSID), a PAN-ID, or the like, that the node uses to access the network. The supervisory device may also optimize the set of APs based on an objective function and on the observed traffic in the network. Diversity is obtained because multiple members of the VAP may receive the same packet from the node, with relatively independent chances of success.

The illustrative VAP protocol described herein also integrates well with deterministic networking (DetNet). In particular, the VAP protocol enables multiple APs to receive a packet from an endpoint node at the same time, creating a natural replication mechanism in which multiple copies of a same packet may be captured, each by a different AP participating in the VAP assigned to the node. Those APs may be connected over different networks and the packet may circulate to the router or the final destination over segregated paths. DetNet elimination may then be used to eliminate duplicate copies, if any. The VAP protocol herein also leverages various networking techniques (e.g., Wi-Fi, controllers, ML processes, etc.), to improve the user experience while maintaining compatibility with the existing network standards and existing endpoint nodes, by creating a virtual AP that is always there and always optimized so the node never tries to roam.

Figure 3A:
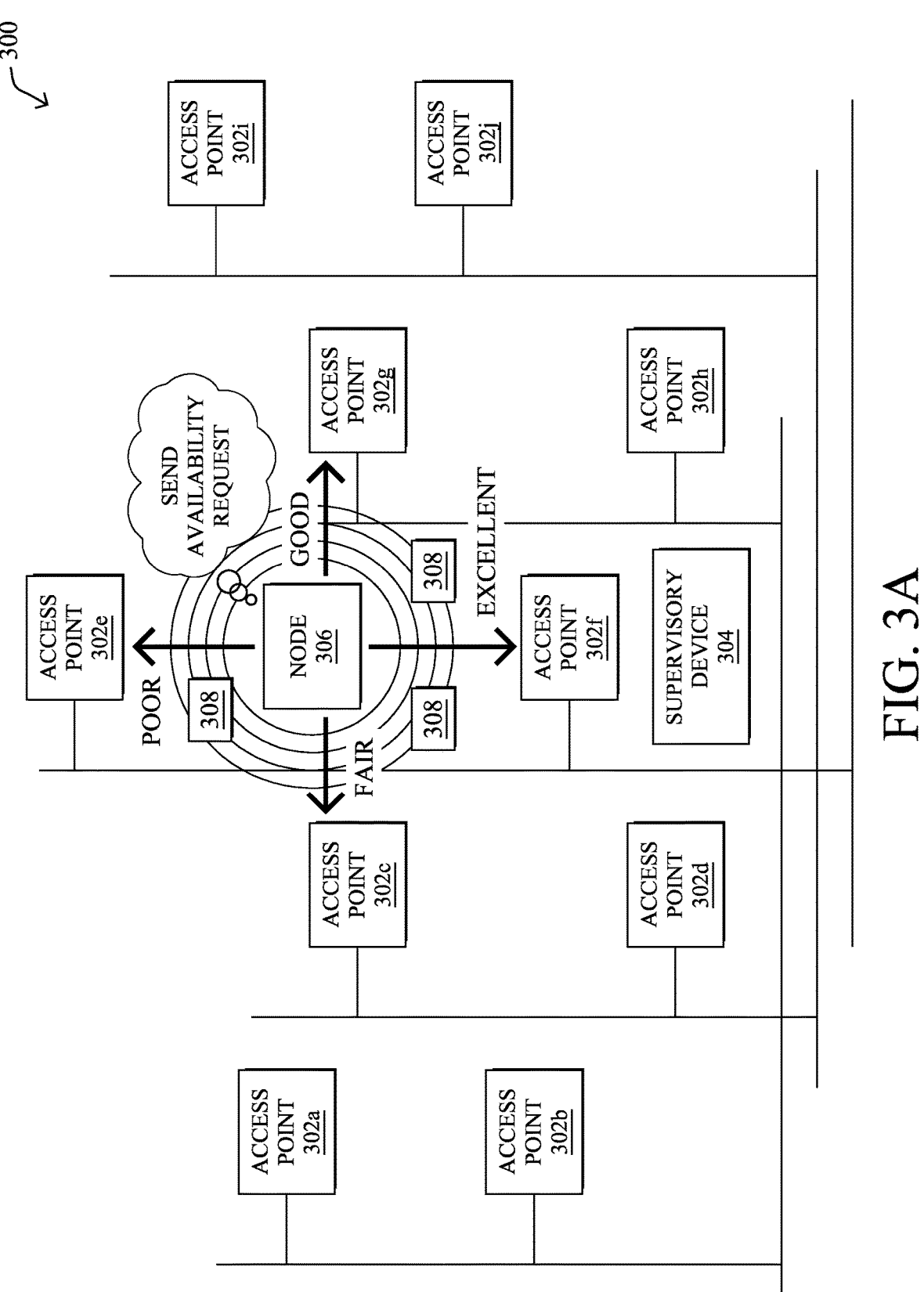
FIGS. 3A-3D illustrate an example of virtual access point (VAP) formation.

FIGS. 3A-3D illustrate an example of virtual access point (VAP) formation, according to various embodiments. As shown in FIG. 3A, assume that there exists a portion 300 of a network that includes a plurality of APs 302 (e.g., APs 302a-302j) that are located in different physical locations through an area (e.g., a building, campus, etc.). APs 302 may be in communication with a supervisory device 304 in the network, such as a wireless controller, other networking device, or, alternatively, a remote device, such as a server located in a data center or cloud computing environment.

Now, assume that a node 306 is attempting to access the network. In such a case, node 306 may broadcast a network availability request 308. The specific format of request 308 may be a function of the specific wireless protocols in use by the network. For example, in the case of 802.11 networks, availability request 308 may be a probe request. As would be appreciated, from the standpoint of node 306, the expected availability response would include an identifier for the available network, such as the SSID of the Wi-Fi network. Reception of availability request 308 by any of APs 302 may trigger the formation of a VAP for node 306, in various embodiments. In further embodiments, a VAP may also be formed at any time after node 306 associates with the network.

In many network implementations, a plurality of APs 302 may receive the broadcast network availability request 308 from node 306, with varying results. Notably, APs 302 within range of node 306 may, by virtue of receiving request 308, capture data regarding request 308, including the contents of request 308 and other characteristics of the received request 308 such as, but not limited to, a link quality indicator (LQI), a signal to noise ratio (SNR), or received signal strength indicator (RSSI), or the like. For example, as shown, AP 302f, which is physically located closest to node 306, may determine that the quality of the received request 308 is "excellent." Similarly, APs 302g, 302c, and 302e may determine that the quality of the received request 308 is "good," "fair," and "poor," respectively.

Figure 3B:
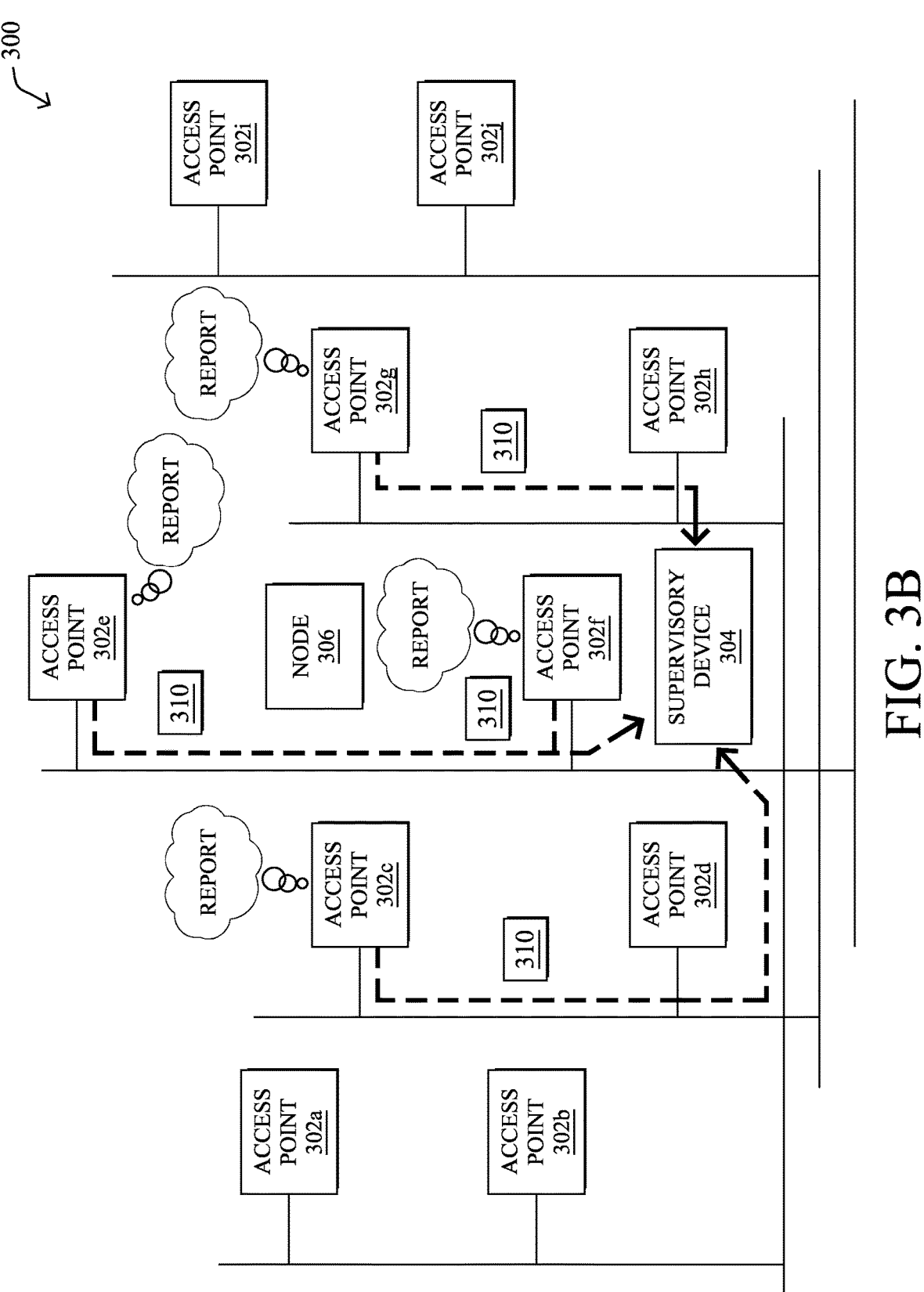

In various embodiments, rather than simply responding to request 308 with the requisite information needed for node 306 to associate with the network, the receiving APs 302 may instead report the captured data regarding request 308 to supervisory device 304. In particular, as shown in FIG. 3B, APs 302c, 302e, 302f, and 302g may send the data 310 regarding the received network availability request 308 from node 306 to supervisory device 304, thereby triggering the formation of a VAP for node 306. Data 310 may include, for example, the identity of the sending AP 302 that received request 308, a MAC address or other networking device identifier for node 306, security status information, and/or at least one metric of the quality of the communication with the node (e.g., signal strength, signal to noise ratio, signal quality, etc.).

Figure 3C:
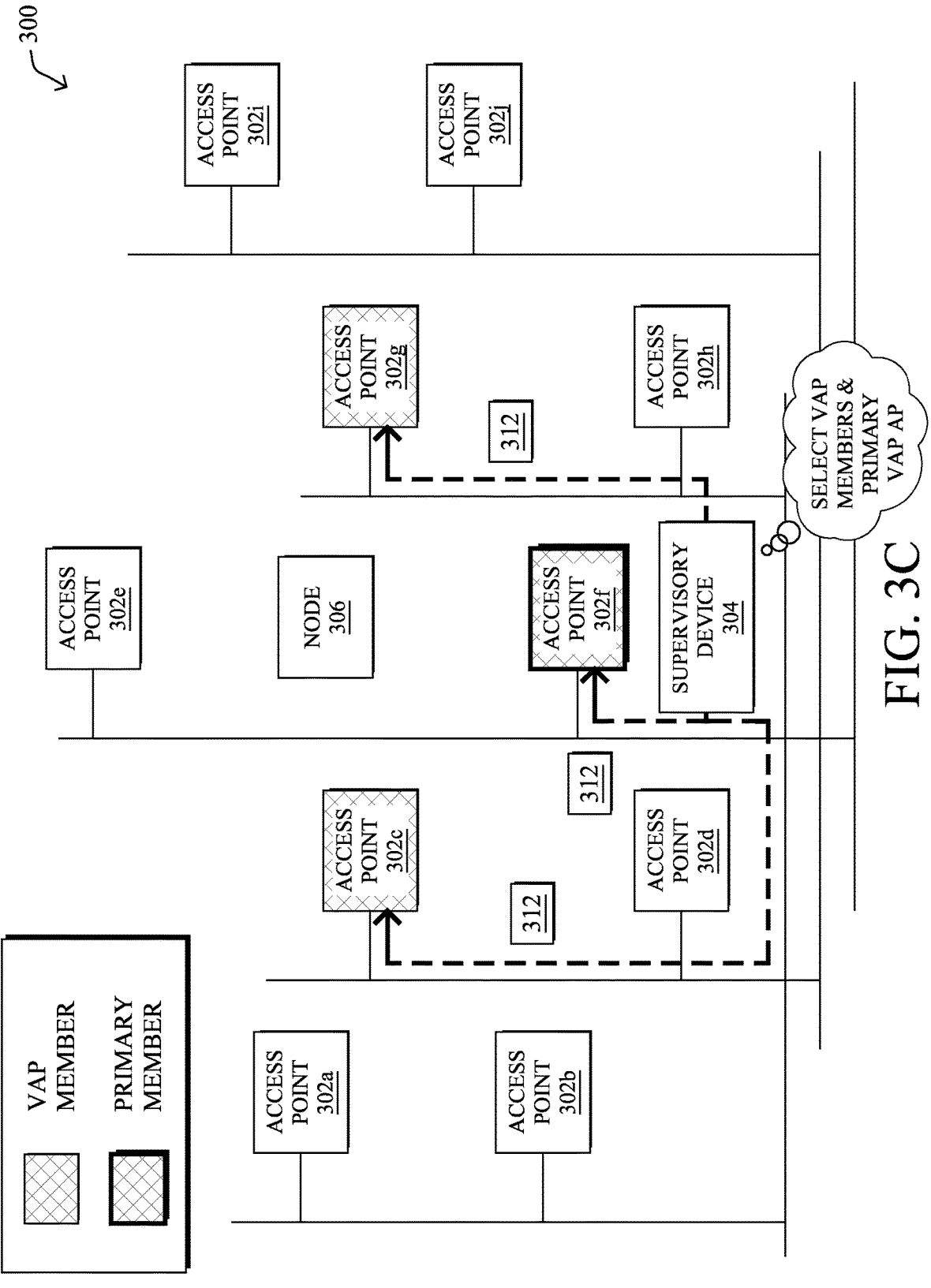

In FIG. 3C, the supervisory device 304 may create a virtual AP (VAP) that is unique to node 306. In general, the VAP may be mapped to any number of APs 302 selected by supervisory device 304 based in part on the data 310 regarding the availability request 308 received by the various APs 302. In other words, the VAP may be a logical construct that is distributed over multiple APs 302. For example, even though APs 302c, 302e, 302f, and 302g received association request 308 from node 306, supervisory device 304 may determine that the set of APs 302 in the VAP mapping for node 306 should only include APs 302c, 302f, and 302g, based on the quality of the received request 308 (e.g., AP 302e may be excluded from the VAP based on the poor quality of the received broadcast signal).

In addition to selecting the VAP member APs 302, supervisory device 304 may also designate one of the selected APs 302 as the primary AP 302 for the VAP. For example, based on data 310 regarding the availability request 308 sent by node 306, supervisory device 304 may determine that AP 302f has the best signal quality and should be the primary AP within the VAP for node 306. In turn, as shown in FIG. 3C, supervisory device 304 may send instructions 312 to the selected APs 302c, 302f, and 302g that include information regarding the VAP. For example, instructions 312 may instruct the selected APs 302c, 302f, and 302g to belong to the VAP for node 306, as identified initially by MAC address of node 306 and, as soon as it is available, by security token, and/or other cryptographic methods.

To implement the VAP in the network, supervisory device 304 may employ a VAP protocol, in order to exchange configuration and data packets with the APs 302. This protocol may be seen as an extension to existing protocols, such as Lightweight Access Point Protocol (LWAPP) and Control and Provisioning of Wireless Access Points (CAP-WAP), or may be specified as a new protocol. For example, the exchanges of data 310 and instructions 312 may use this VAP protocol.

Figure 3D:
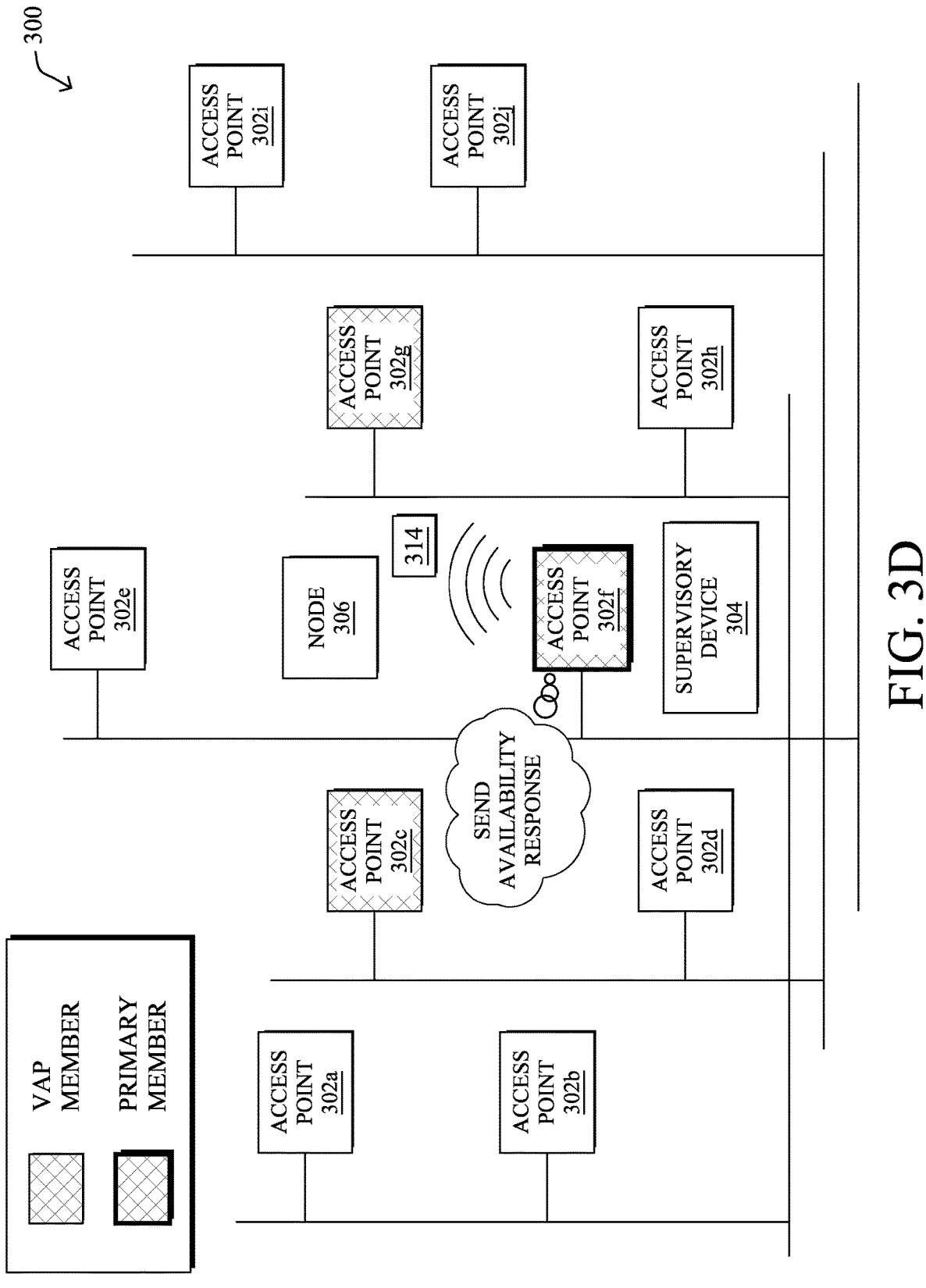

As shown in FIG. 3D, once the VAP has been generated and APs 302c, 302f, and 302g selected for mapping to the VAP, the primary AP 302f may send a network availability response 314 back to node 306. For example, response 314 may be a unicast probe response that has the same information as a beacon frame. In various embodiments, response 314 sent by primary AP 302f to node 306 may also include a unique network identifier associated with the VAP. For example, response 314 may include an SSID or PAN-ID generated by supervisory device 304 specifically for use with the VAP. In turn, node 306 may use the received response 314 to associate with the network, as it would under normal conditions. From the standpoint of node 306, it is associating with the network normally via AP 302f and may remain unaware of the existence of its associated VAP.

Figure 4A:
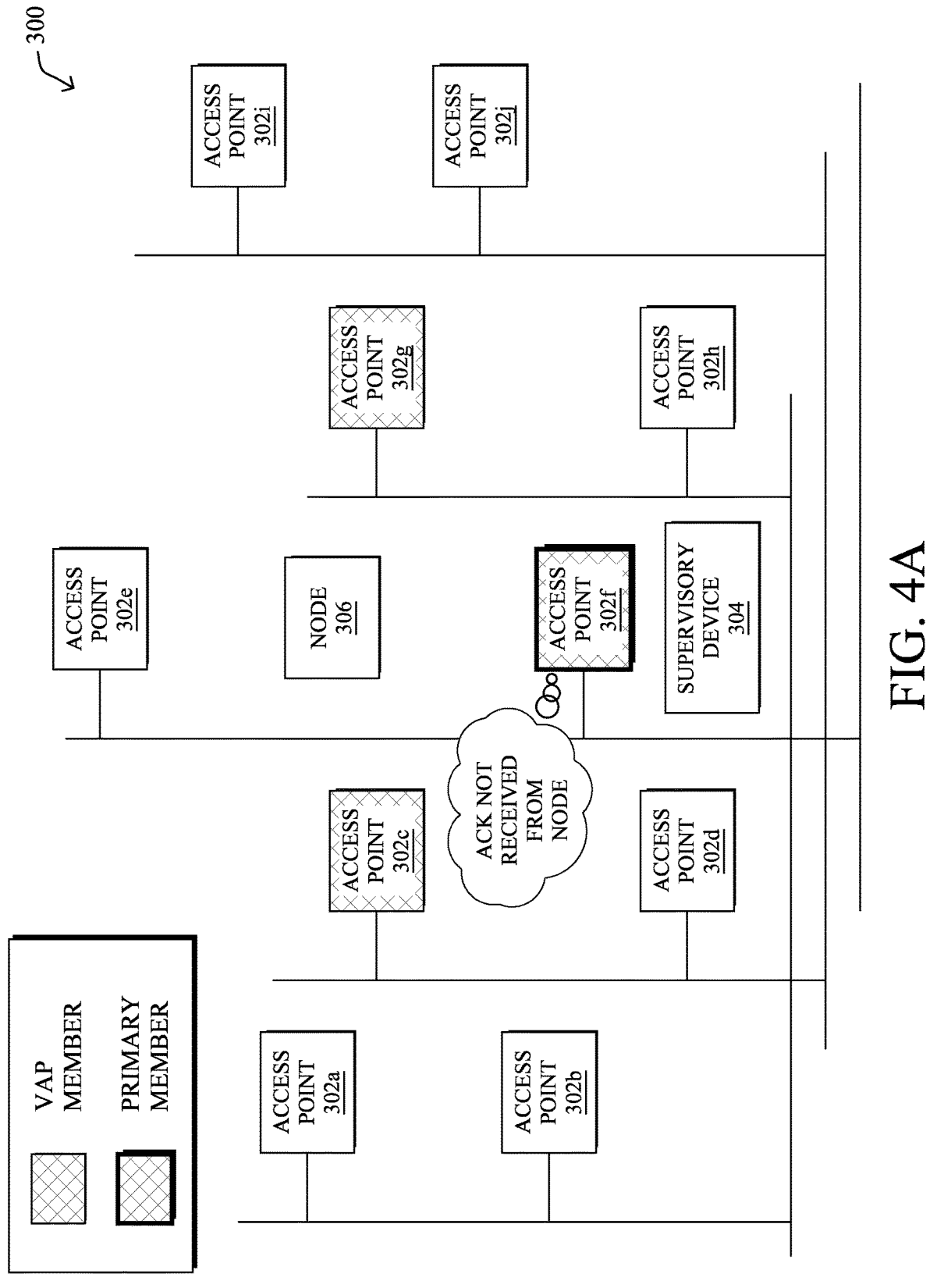
FIGS. 4A-4B illustrate an example of the operation of a VAP.
Figure 4B:
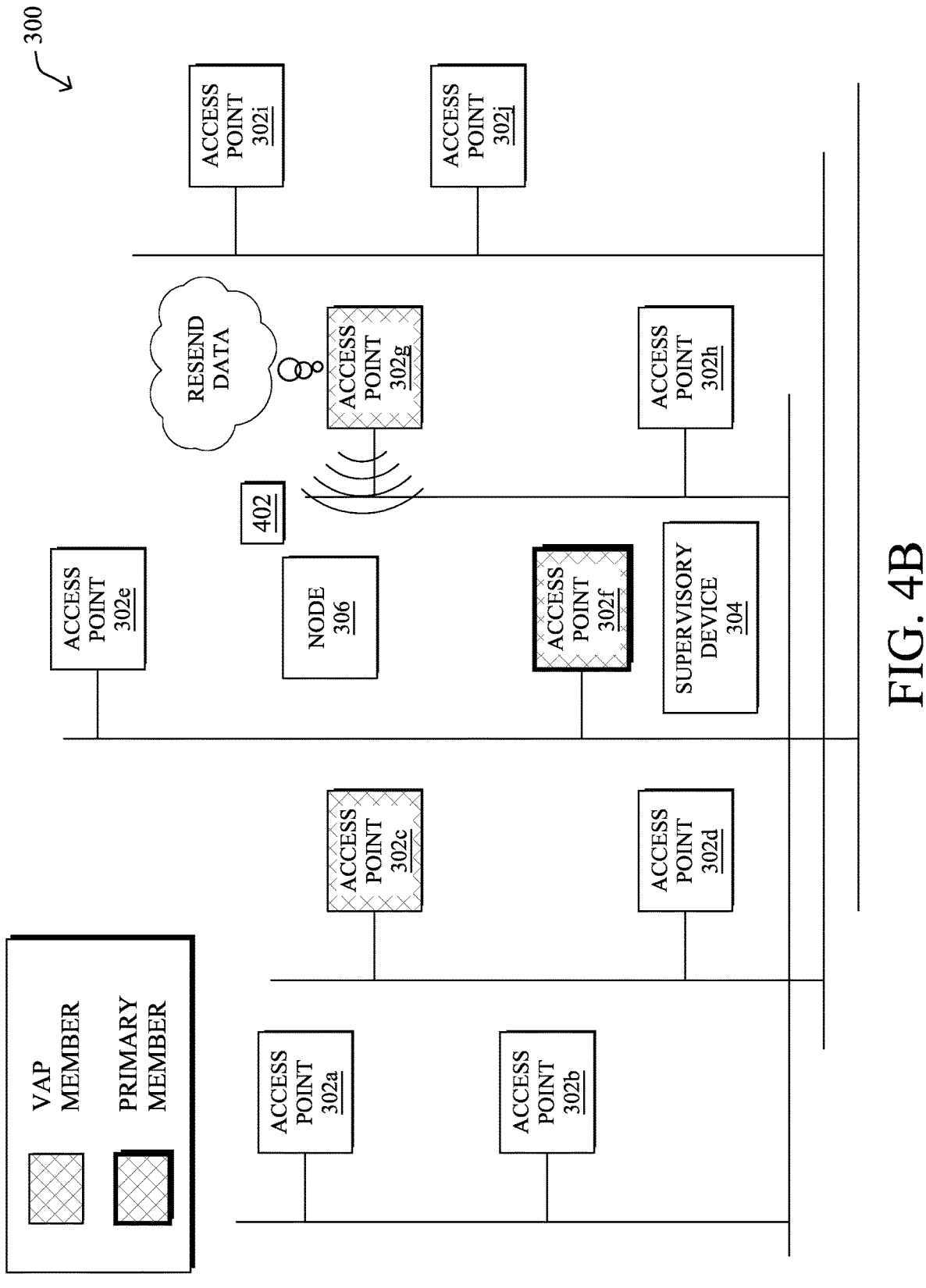

FIGS. 4A-4B illustrate an example of the operation of a VAP after formation, according to various embodiments. Continuing the examples of FIGS. 3A-3D, when forming the VAP for node 306, supervisory device 304 may also build an ordered list of the other APs 302 in the VAP mapping and conveyed to the selected APs 302 via instructions 312. In general, the ordered list may be used to add special diversity and improve the chances of a successful reception versus a retry from a given AP 302 that has already failed once. For example, as shown in FIG. 4A, assume that primary AP 302f has sent a message to node 306, but that message has not been acknowledged by node 306. Under normal circumstances, AP 302f would then attempt to retry sending the message again to node 306. However, according to various embodiments, as shown in FIG. 4B, AP 306g may instead resend the message 402 to node 306. Because the resend is sent from a different AP, the added spatial diversity increases the chances that the resent message 402 is received and acknowledged by node 306.

In various embodiments, learning machines may play a key role in the assignment of APs to a VAP and/or in the adjustment of an existing VAP. For example, such a learning machine may be trained to select APs 302 for inclusion in a given VAP based on a location estimation for the corresponding node (e.g., from data 310) and/or the desired optimization for the traffic expected from that type of node. For example, the location of node 306 may be derived from a Time Difference of Arrival value (TDOA or DTOA) and/or using triangulation between different APs 302.

Such a traffic optimization may be based on a history of traffic for the type of node, in some cases. As would be appreciated, the type of approach taken by the learning machine(s) may also vary with the specific objective function for the traffic and node type. For example, assume that node 306 is a particular type of telepresence device and that video traffic from similar devices has required a certain degree of network performance (e.g., in terms of drops, delay, jitter, etc.). In such a case, the learning machine may use its model for this node type, as well as any necessary metrics from the APs 302 in the network, to select an appropriate VAP mapping to satisfy the objective function. Note that the objective function will also dramatically influence the set of metrics to be gathered from APs after the scanning phase but also during the lifetime of a VAP. Indeed, according to the objective function, the set of required features, in machine learning terms, may vary, and the frequency of AP selection for the VAP will also vary.

Figure 5A:
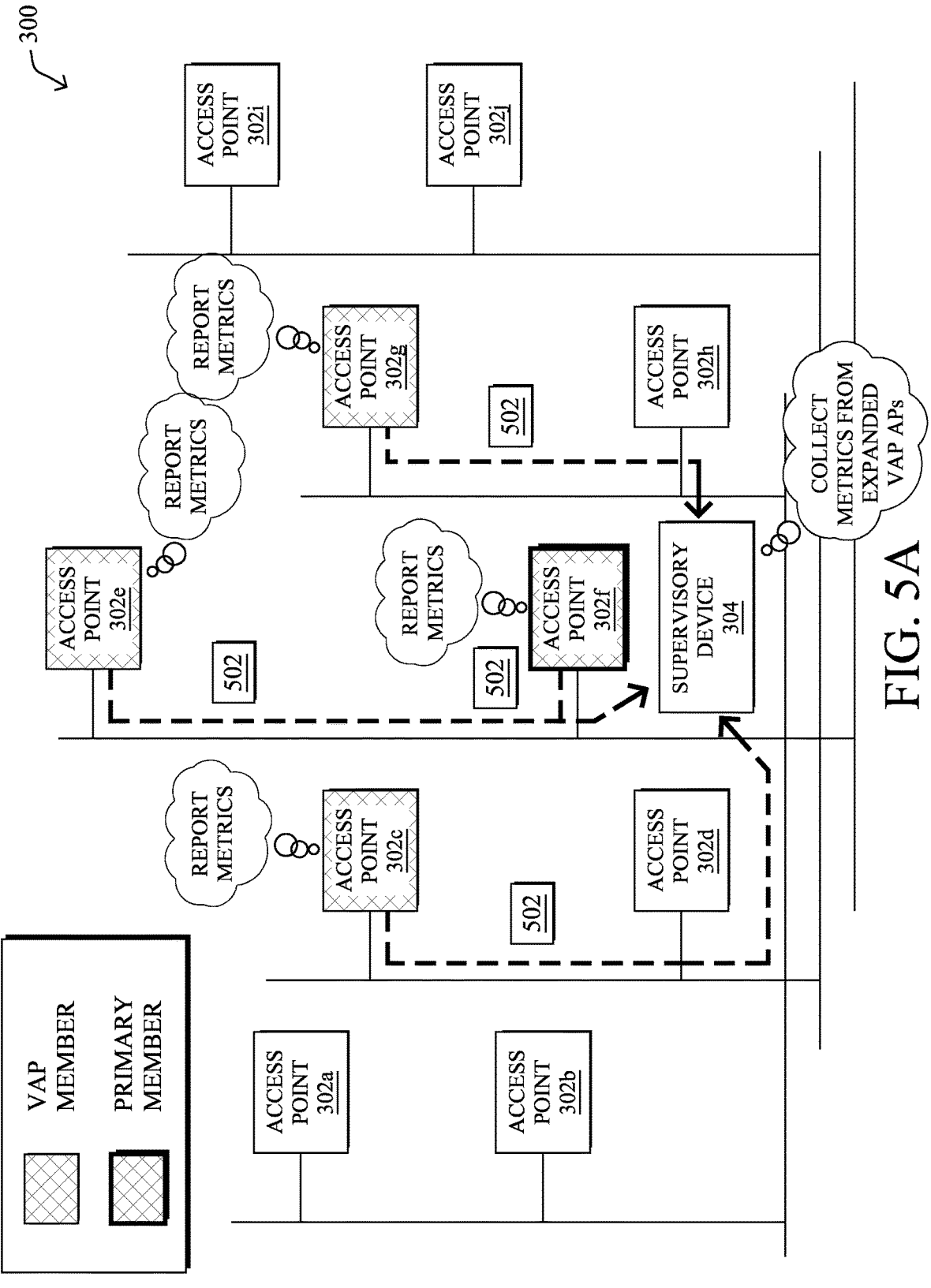
FIGS. 5A-5C illustrate an example of adjusting a VAP mapping.
Figure 5B:
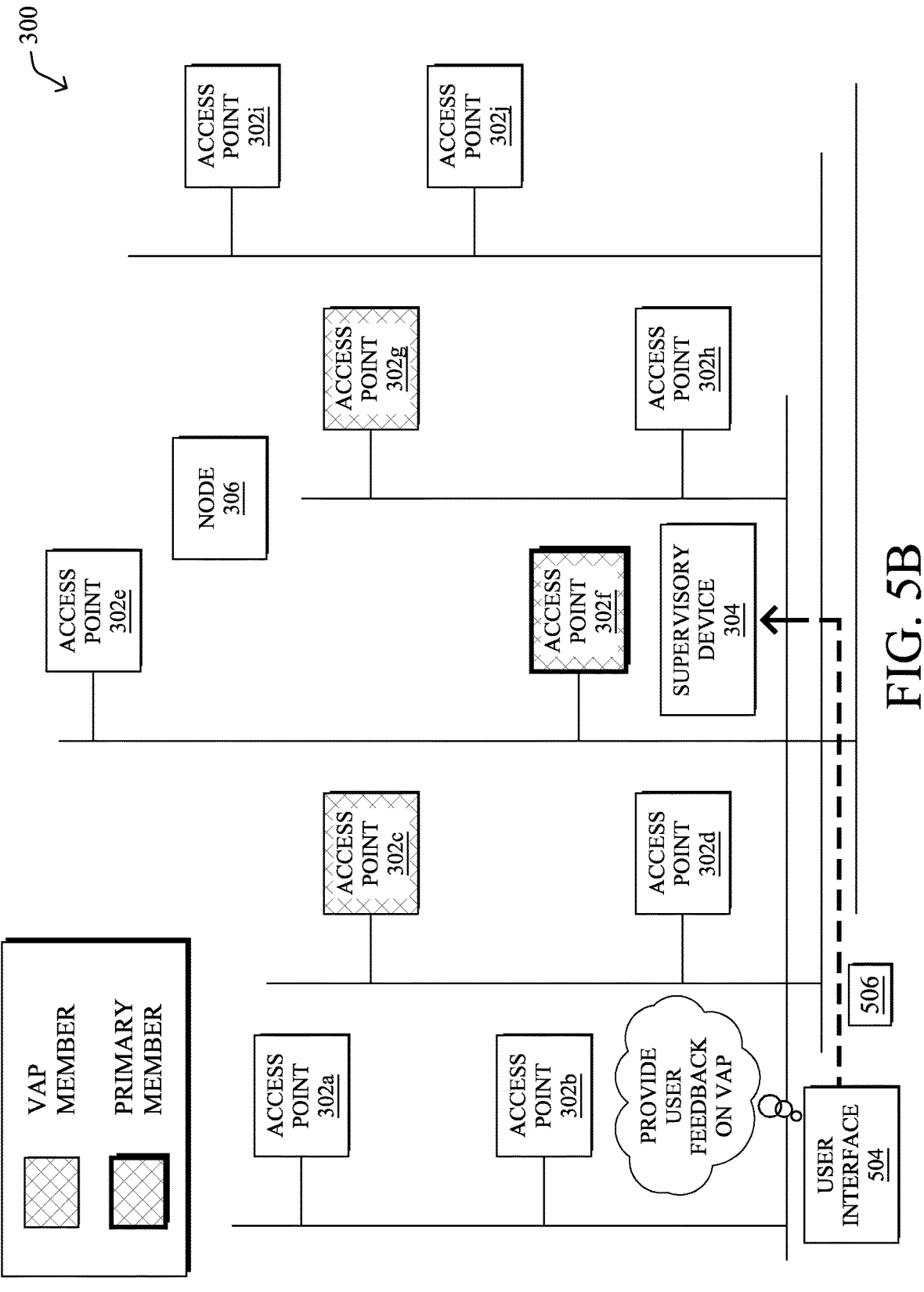
Figure 5C:
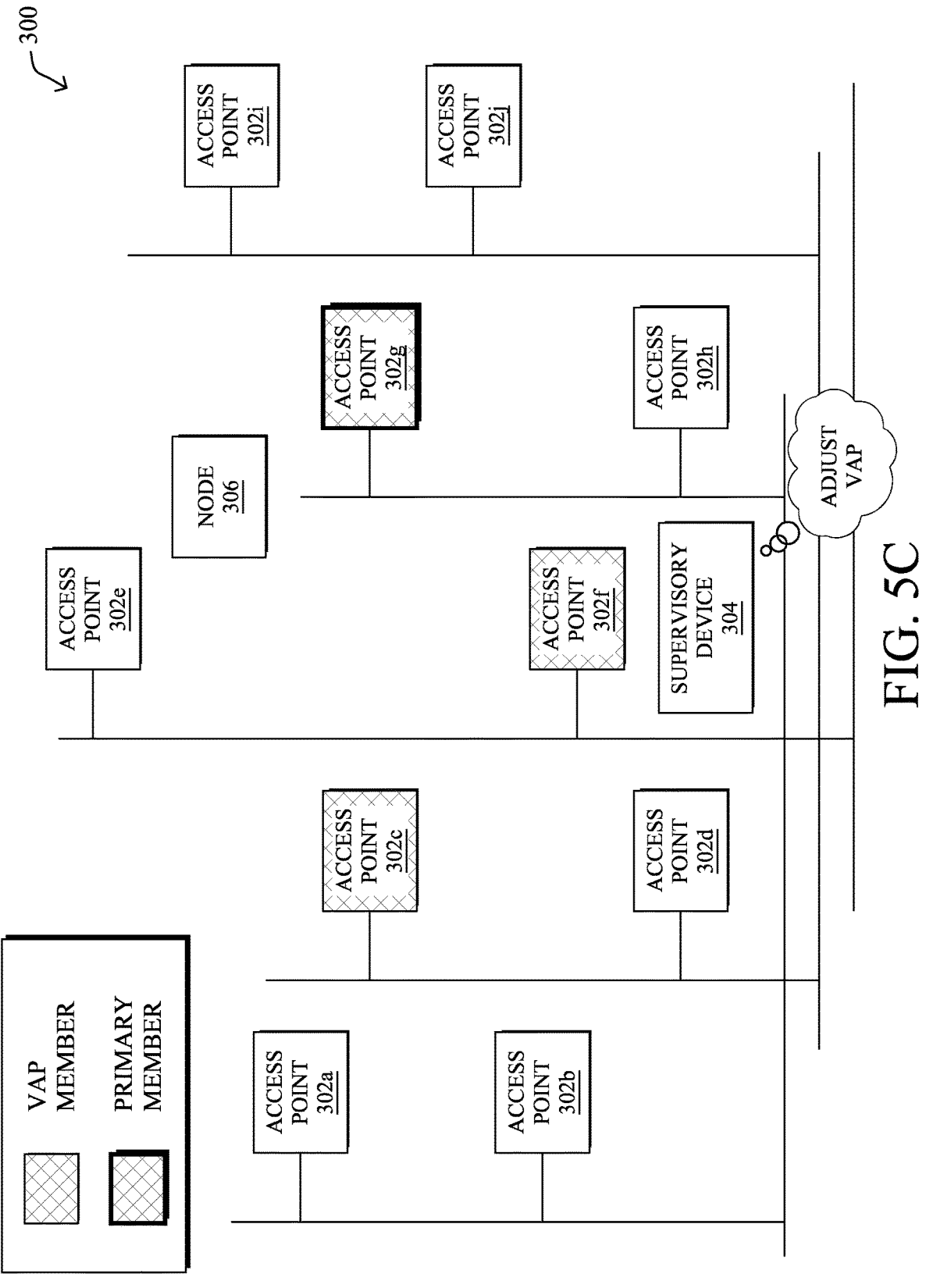

FIGS. 5A-5C illustrate an example of adjusting a VAP mapping, according to various embodiments. Even after formation of a VAP for a given node, supervisory device 304 may continue to monitor and adjust the VAP, in order to ensure that the objective function of the corresponding machine learning model for node 306 continues to be met. To do so, the following message types are introduced herein as part of the VAP protocol:

1.) VAP commands sent by the learning machine to APs 302, to gather metrics of interest (e.g., network characteristics/statistics), report the VAP group membership, etc.

2.) VAP metrics sent by the responding APs 302 to the learning machine and used by the objective function to compute the VAP membership (e.g., based on signal/noise ratio, signal strength, etc.).

3.) VAP stats reports sent by APs 302 to the learning machine and used to evaluate the VAP efficiency. Such stats reports may be used to gather statistical data used by the learning machine to determine the "efficiency" of the VAP group, which can be used by the learning machine to consistently adjust the VAP according to an objective function.

4.) Learning machine stats sent by learning machine to a user interface, to report objective function efficiency results.

In various embodiments, for purposes of collecting network metrics/characteristics and VAP stats from APs 302, supervisory device 304 may occasionally increase or otherwise adjust the APs in the VAP mapping. For example, as shown in FIG. 5A, supervisory device 304 may include AP 302e in the VAP mapping for purposes of data collection after formation of the VAP (e.g., via an instruction 312, even though AP 302e was not included in the original VAP mapping. This allows AP 302e to collect and report information that would not otherwise be possible using the original APs of the VAP. For example, by changing the set of APs, the learning machine can change the TDOA listeners and optimize the distance estimation, e.g., by adding APs while doing a measure, or triangulating between different sets of APs. Such collected information 502 may be reported to supervisory device 304, either on a push or pull basis. After the data collection, supervisory device 304 may opt to revert the VAP mapping back to its previous membership or make further adjustments to the AP memberships, accordingly.

As shown in FIG. 5B, supervisory device 304 may also convey data regarding the performance of the VAP (e.g., the objective function, etc.) to a user interface 504 for review by a user. In some embodiments, the learning machine may also use reinforcement learning to adjust its model for node 306 and make changes to the VAP mapping, accordingly. In such a case, the user of interface 504 (e.g., an admin device, etc.)

may provide feedback 506 to the learning machine about the VAP efficiency, which is then used by the LM to adjust the strategy adopted to compute the VAP mapping.

Based on the captured network characteristics from the APs, the performance statistics for the VAP itself, and/or user feedback, the machine learning process may adjust the VAP by changing the APs in the VAP mapping. For example, as shown in FIG. 5C, assume that node 306 has move to a new physical location and is now in closer proximity to APs 302e and 302g. In such a case, supervisory device 304 may select a new set of APs 302 for the VAP of node 306 and send out corresponding instructions to the APs. Notably, as shown, supervisory device 304 may select a new set of APs for the VAP of node 306 that includes APs 302e, 302f, and 302g, with 302g now designated as the primary AP.

Thus, the generated VAP may add spatial diversity to any CSMA/CA LLN, in a manner somewhat akin to that of the LoRa model. However, in contrast to the techniques herein, LoRa uses different MAC operations and does not support the faster speeds of the components (e.g., PHY) used in today's IoT network devices. Additionally, LoRa does not support the association process, the use of identities (e.g., PAN-ID or SSID), and the automatic repeat request (ARQ) process for acknowledgement and retry, which are supported using the techniques herein. Further, LoRa does not support multicast communications, either.

——Transparent Roaming in VAP-Enabled Networks——

User experiences in wireless networks can vary considerably. For instance, in many networks today, when a node roams from one access point (AP) to the next, as it moves, the node must de-associate from the first AP and re-associate with the next. During a transient period between the break and the make, the service may be interrupted. In particular, during that transient time, the node may also scan for APs across frequencies, introducing additional time of the blackout.

Even during a period where the mobile device is consistently attached to the same AP, fluctuations in the radio quality and concurrent accesses to the medium can impact the observed quality by forcing the device to degrade the transmission rate or wait to get access to the medium. For example, when the number of IoT nodes increases on a given channel/frequency, the expected service may start to fail.

From the user perspective, the above situations lead to a noticeable variation in the quality of the link, from non-functional to very different speeds, all within short windows of time. In short, the experienced quality lacks determinism, which bars a number of operational technology (OT) use cases, as well as impacting simple user experiences such as online media.

On the other extreme, and as opposed to traditional markets that can be addressed with Hi-power Wi-Fi, a number of IoT use cases require deterministic properties and, in particular, high reliability and bounded latency. Specific MAC operation (e.g., audio Bluetooth, TSCH, etc.) enable a deterministic MAC and are not subject to the techniques herein. Rather, the techniques herein are interested in improving in the CSMA/CA operations that are typical in the considered standards.

In particular, network dynamics (e.g., the physics of radio frequency links, etc.) on the one hand, and determinism on the other hand, place contradictory constraints on the network implementation. Notably, radio fluctuations are hardly predictable since they depend on factors such as the statistical quality of the radio transmission, erratic user movements, movement of external reflectors, and the like. On the other hand, determinism ensures a consistent experience of the network, which requires resource reservations with precise timing over non congruent paths to provide the best level of guarantees in terms of delivery ratio and latency. In deterministic IoT networks, such as 6TiSCH networks, this tension is alleviated by the facts that: 1.) the medium is scheduled, so a guaranteed and timely access can be granted, 2.) changes in a deterministic path (equivalent to a roaming decision) are decided by a central path computation engine (PCE) as opposed to the device, 3.) the PHY speed is constant.

Unfortunately, CSMA/CA-based networks operate on the exact opposite premises that:

1.) The roaming decision is made by the network node itself, as opposed to the AP. This is done with no visibility on the actual AP deployment vs. the node movement.

2. The node adapts its transmission speed to adjust to the transmission quality and limit the contention. A higher speed reduces the footprint on the medium, but only if the transmission succeeds. When it does not, consecutive retries are a lot more harmful to the overall medium than sending the frame at a lower speed in the first place. In case of low contention on the medium, and if the gating factor for the overall speed is the transport layer, a higher data-rate on the link layer is not necessarily desirable anyway.

3.) The medium access is based on contention, and upon collision, the device must decide when to try again. The optimum depends on the number of contenders, but the method of exponential backoff leaves it to chance.

Making all of the above decisions is very delicate for an IoT node or other node with limited processing power and no awareness of its environment. The decision may depend on an overall objective, such as limit latency by avoiding retries, or maximize data-rate or overall throughput, but the node has no visibility on the intention of the application or the goals of the network administrator. For example, from the perspective of the node, it will not be able to distinguish between a conference with a high density of users generating mail and Web traffic and a home network with a few users streaming video or playing interactive games.

The techniques herein, therefore, attempt to optimize the wireless experience by transferring the core decisions idea to Learning Machines (LMs), either located on premise, or in the cloud in a fashion that is backward compatible with the standards such as 802.15.4 and Low Power Wi-Fi. Said differently, the techniques herein optimize the CSMA/CA experience by transferring the core decisions idea to LMs in a fashion that is backward compatible with the incumbent standard (e.g., Wi-Fi or 802.15.4). In some aspects, LMs track node movement and dynamically assign the best APs to the VAP of the node. The VAP presents a constant posture from the perspective of the node, which never finds a reason to roam. As a result, the actual decisions such as which AP gets a packet from that node, or sends a packet to that node, are transferred to the infrastructure and optimized by LMs. In another aspect, feedback loops may be employed to constantly adjust the AP selection in the VAP according to the approach used by the node to select a best AP and thus to avoid roaming, leading to improved determinism.

Note that IEEE 802.11r proposes roaming optimizations, but that is still a node decision, unlike the techniques herein, where the node does not roam at all, but it is the APs mapped to the VAP that change, to maintain a constant posture towards the node. Also, while some vendors enable make-before-break handover for Wi-Fi, such techniques require a node equipped with two radio transceivers.

Specifically, according to various embodiments herein, a supervisory device in a network forms a virtual access point (VAP) for a node in the network. A set of access points (APs) in the network are mapped to the VAP as part of a VAP mapping and the node treats the APs in the VAP mapping as a single AP for purposes of communicating with the network. The supervisory device receives measurements from the APs in the VAP mapping regarding communications associated with the node. The supervisory device identifies a movement of the node based on the received measurements from the APs in the VAP mapping (e.g., based on the node sending an NDP sounding message to any or all of the VAP members). The supervisory device adjusts the set of APs in the VAP mapping based on the identified movement of the node.

Illustratively, the techniques described herein may be performed by hardware, software, and/or firmware, such as in accordance with the illustrative "Virtual Access Point (VAP)" process 248, which may include computer executable instructions executed by the processor 220 (or independent processor of interfaces 210) to perform functions relating to the techniques described herein, e.g., in conjunction with routing process 244 or other processes as appropriate. In particular, the VAP process 248 may be a component of an IoT device, a cloud device, or any other participating device for the techniques described herein.

Operationally, and with reference to the examples in FIGS. 6A-6E, the techniques herein apply to an environment, such as a VAP-enabled CSMA/CA IoT network, or, more generally, to any other form of wireless network with multiple APs. Also, as done above, the description below uses Low Power Wi-Fi parlance of APs to refer to the fixed network antennas/transceivers, though other similar terminology may be used for similar functionality.

According to the techniques herein, the APs that belong to the VAP of a node change dynamically to follow the node so that the node does not experience a loss of service and does not attempt to roam. As a result, there is no window of time during re-association whereby the node is temporarily cut off from network services. Notably, roaming is avoided by adjusting the AP(s) mapped to the VAP of the node using predictive analytics (machine learning) in such a way that there is no more roaming.

In some embodiments, the APs in a node's VAP use the control VAP protocol messages described previously, to tell the controller/supervisory device about measurements regarding communications associated with the node. Such measurements may comprise wireless signal information such as strength, quality, etc., or any other information regarding the communications associated with the node. In turn, when the quality is degrading for one or more APs, the controller/supervisory device may select a number of new APs and places them temporarily in the VAP, as described previously with respect to FIG. 5A. If the measurements from these APs are better than that of the existing VAP members, the supervisory device may adjust the VAP.

Figure 6A:
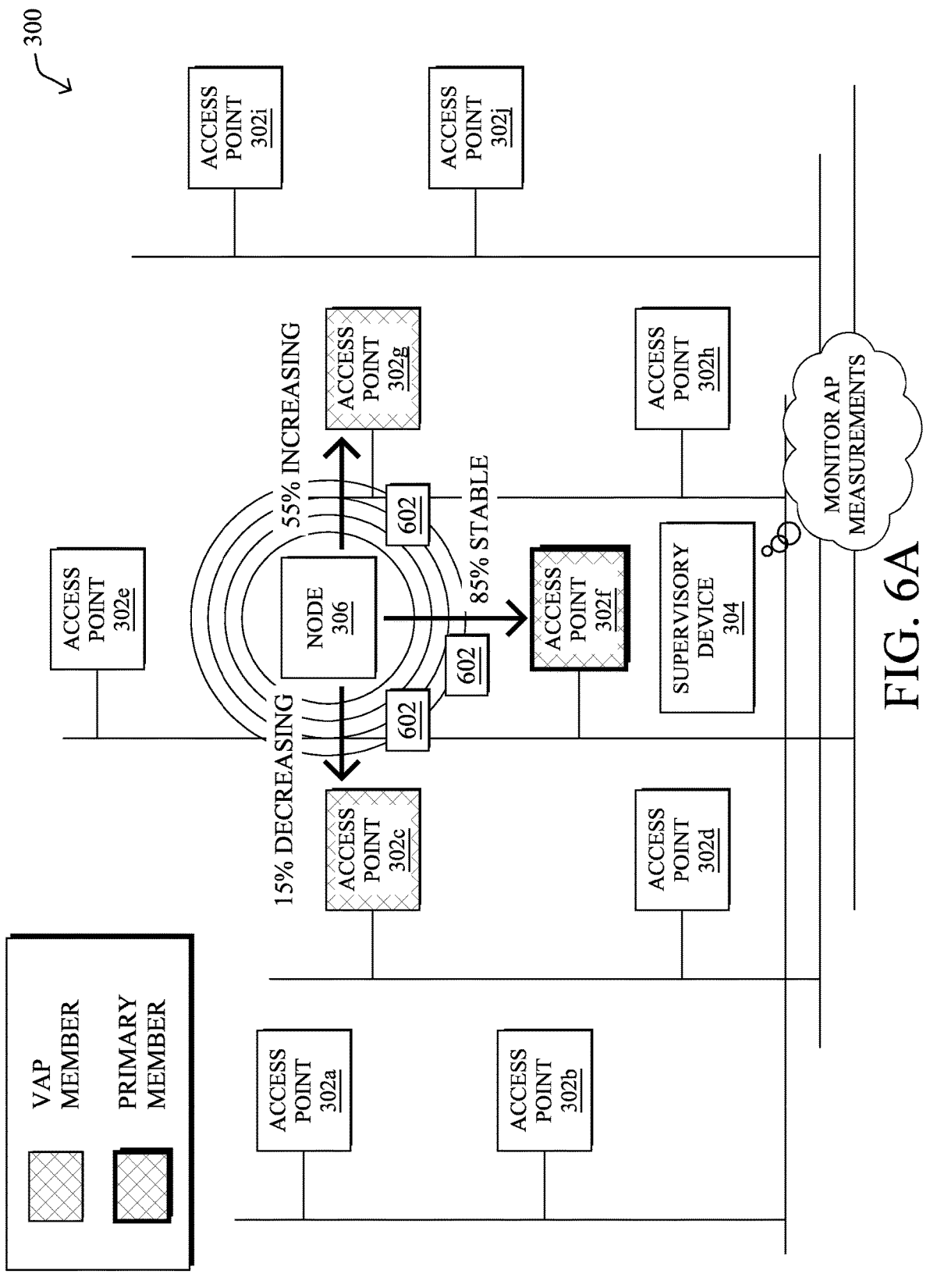
FIGS. 6A-6E illustrate an example of transparent roaming in a VAP-enabled network.

In various embodiments, as shown in FIG. 6A, supervisory device 304 may receive measurements regarding the communications 602 associated with node 306 from the APs 302 in its vicinity. As noted, these measurements may include information regarding these communication signals such as a link quality indicator (LQI), a signal to noise ratio (SNR), a received signal strength indicator (RSSI), or any other measurement regarding the communications 602 (e.g., sounding results, etc.). Using the techniques above, supervisory device 304 may also vary the APs in the VAP mapping, as needed, to obtain test measurements from other APs 302 regarding communications 602, as well. Further measurements may also indicate, for example, retry information, such as when the primary AP in the VAP mapping (e.g., primary AP 3020 fails to reach node 306 and a backup AP in the VAP mapping (e.g., AP 302g) retransmits the packet to node 306.

Figure 6B:
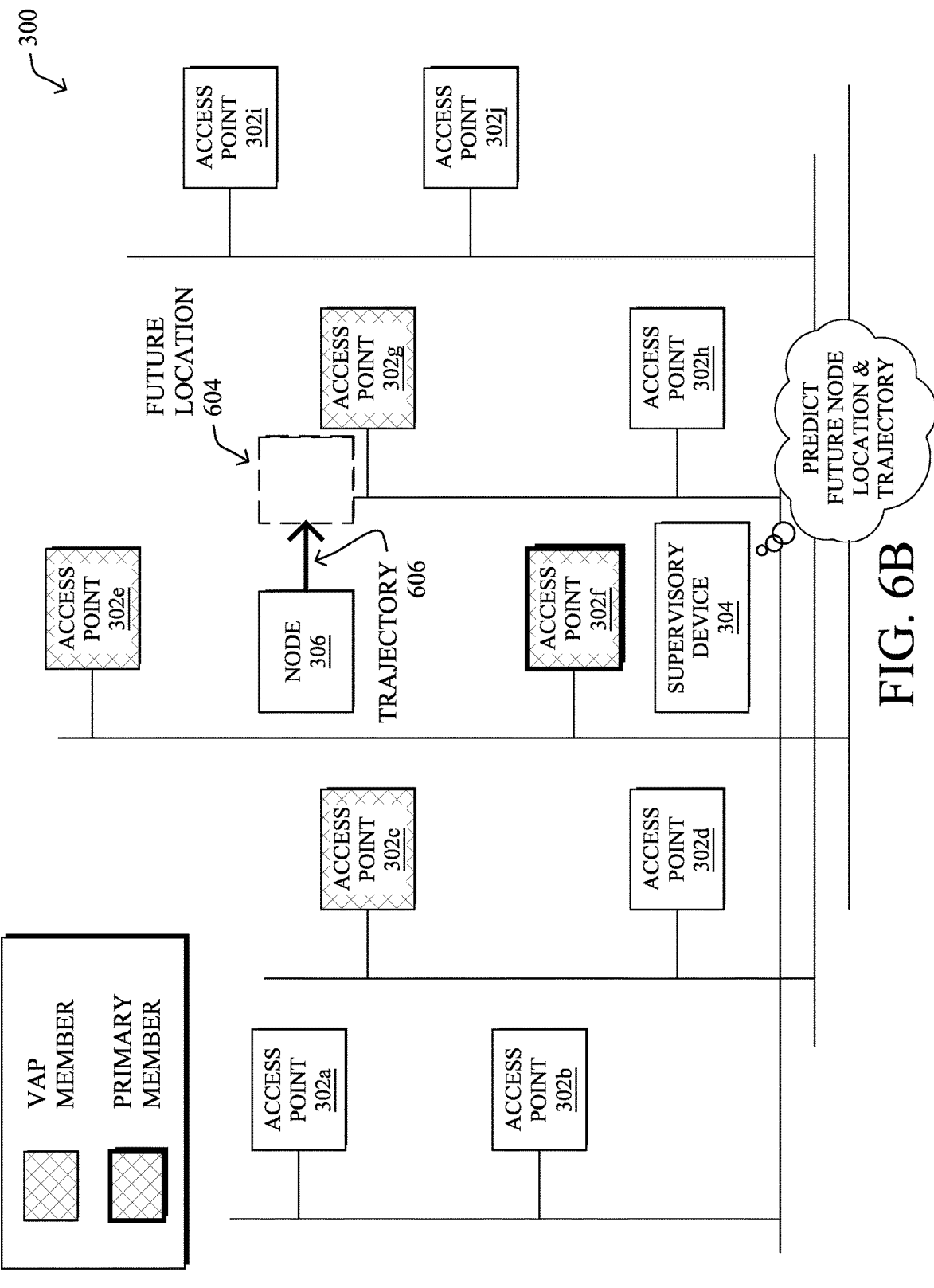

As shown in FIG. 6B, supervisory device 304 may use the received measurements regarding the communications associated with node 306 to determine a movement of node 306. For example, consider the case in FIG. 6A in which AP 302c indicates that its signal from node 306 is at 15% quality and is decreasing, AP 302f indicates that its signal from node 306 is at 85% quality and is stable, and AP 302g indicates that its signal from node 306 is at 55% quality and is increasing. In such a case, as illustrated in FIG. 6B, this may indicate that node 306 is moving away from the location of AP 302c at a trajectory 606 and will be located at future location 604 at a certain time.

In one embodiment, supervisory device 304 may use a time difference of arrival (TDOA)-based approach, to identify the location of node 306 and its direction/trajectory of movement. In such an approach, the measurements taken by the various APs 302 can be compared to one another from a timing standpoint, to help pinpoint the current location of node 306. By tracking the current locations of node 306 over time, supervisory device 304 can determine the future location 604 and trajectory 606 of node 306.

In some embodiments, supervisory device 304 may also leverage external information such as matching node 306 with a particular user (e.g., based on 802.1x) and then matching scheduling information or external telemetry for the user with a given location. For example, data from a calendaring system or room reservation system may indicate that the user will soon travel from one meeting room to another and supervisory device 304 can use this information to predict the trajectory that the user will take and when.

Figure 6C:
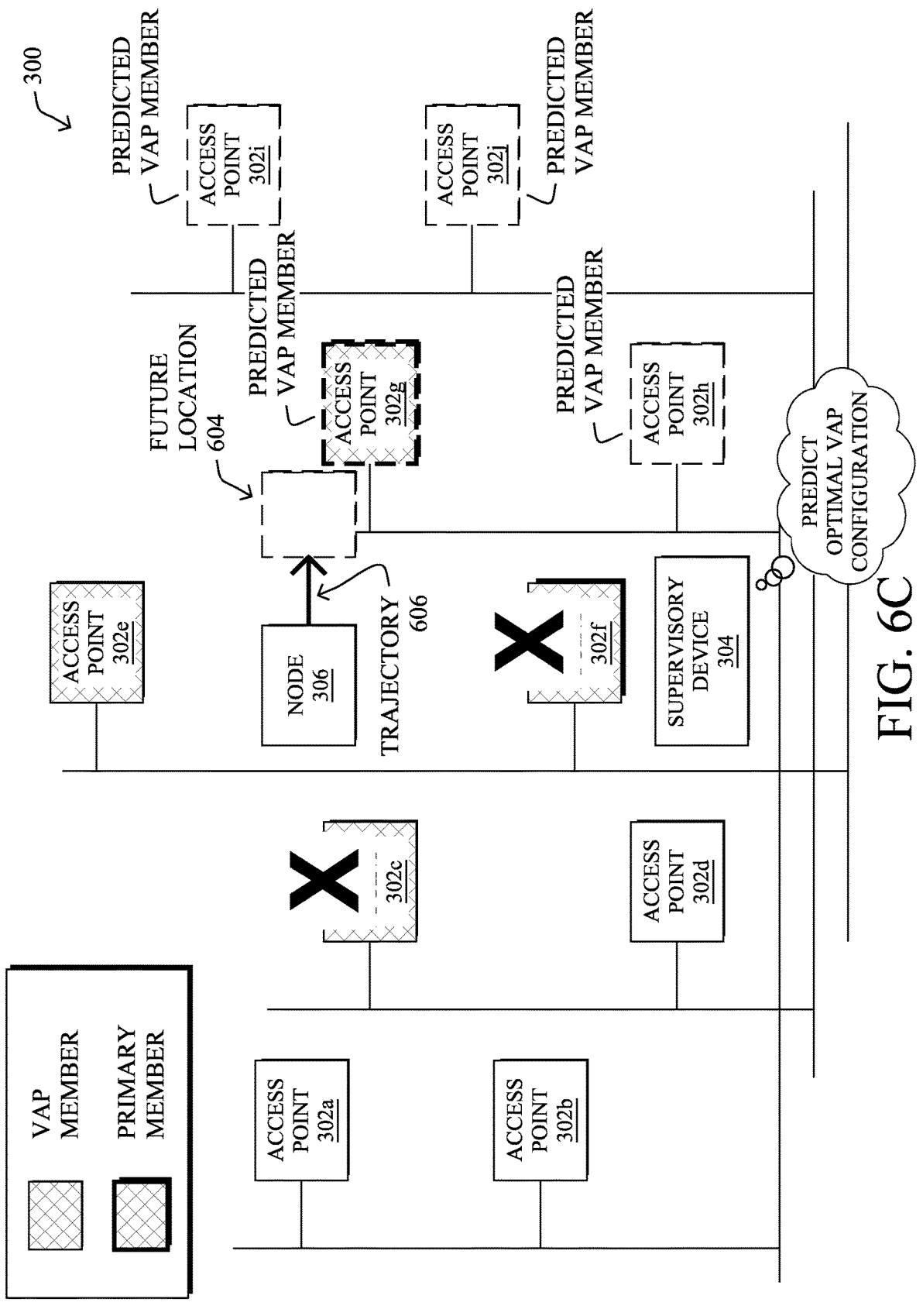

As shown in FIG. 6C, supervisory device 304 may predict an optimal VAP configuration based on the movement of node 306. For example, supervisory device 304 may derive new APs 302 for the VAP of node 306, based on the location and/or movement of node 306. Particularly, as shown, assume that supervisory device 304 predicts that node 306 will be located at future location 604 at a certain time and moving along trajectory 606. In turn, supervisory device 304 may use one or more LMs, to predict the optimal set of APs in the VAP mapping for that location and time. Notably, as node 306 moves away from APs 302c and 302f, supervisory device 304 may determine that these APs should be phased out of the VAP mapping. In addition, supervisory device 304 may determine that the updated VAP mapping should include APs 302g-302j, with AP 302g acting as the new primary AP for the VAP.

LM techniques can be used to improve the chances of selecting the next APs as the node moves. For example, a user will probably follow a path that is similar to one followed by previous users across open spaces full of cubicles. The techniques herein provide the ability to constantly predict the user movements in order to automatically determine the best APs for the VAP mapping and avoid roaming by the node.

In various embodiments, supervisory device 304 (e.g., a wireless controller, a cloud-based service, etc.) may execute two machine learning models in conjunction with one another: 1.) a trajectory tracking model responsible for predicting the location where node 306 will be in the future, and 2.) a VAP configuration prediction model that predicts the optimal changes to the VAP mapping for that future location. For example, such a configuration change may determine which AP will be the preferred AP for the node at that future location. Note further that the configuration prediction may make use of different strategies to predict the best AP for a given node (e.g., on a per-node basis), since different nodes may use different AP selection strategies. In other words, the machine learning model may also take into account the AP selection approach taken by node 306, when predicting optimal VAP changes for its future location.

For the sake of illustration, the movement prediction can be performed using ML approaches such as Hidden Markov Chain, or Adaptive Resonance Theory (ART). As far as predicting the VAP configuration, this can be specified as a regression problem (e.g., with an objective function being tied to a deterministic metrics such as time to transmit, and input features will be all measurements available at the node itself). That being said, in the embodiments herein, the objective is not to find the AP that will optimize determinism, but the AP that will likely be selected by node 306, so as to avoid roaming.

Figure 6D:
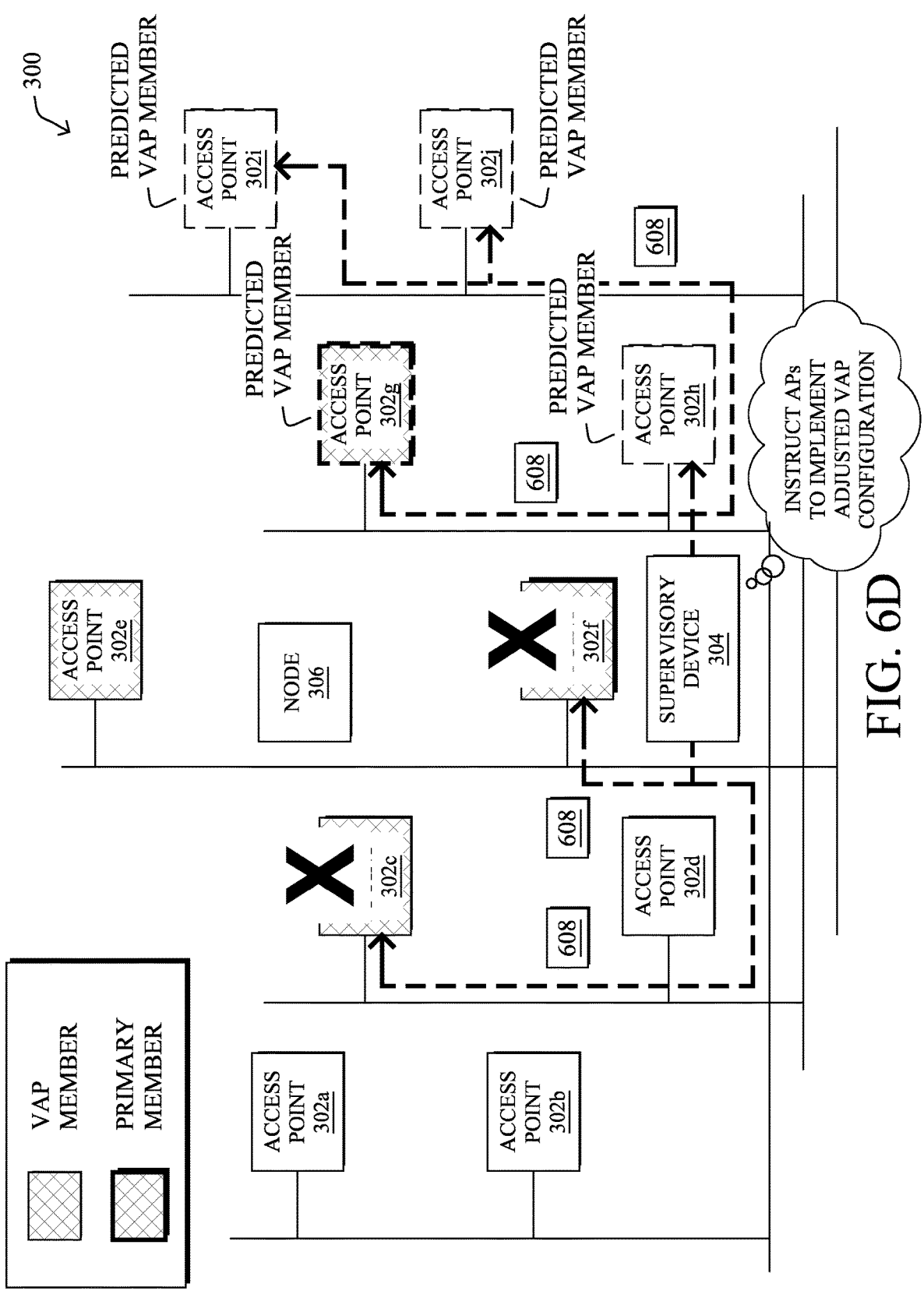
Figure 6E:
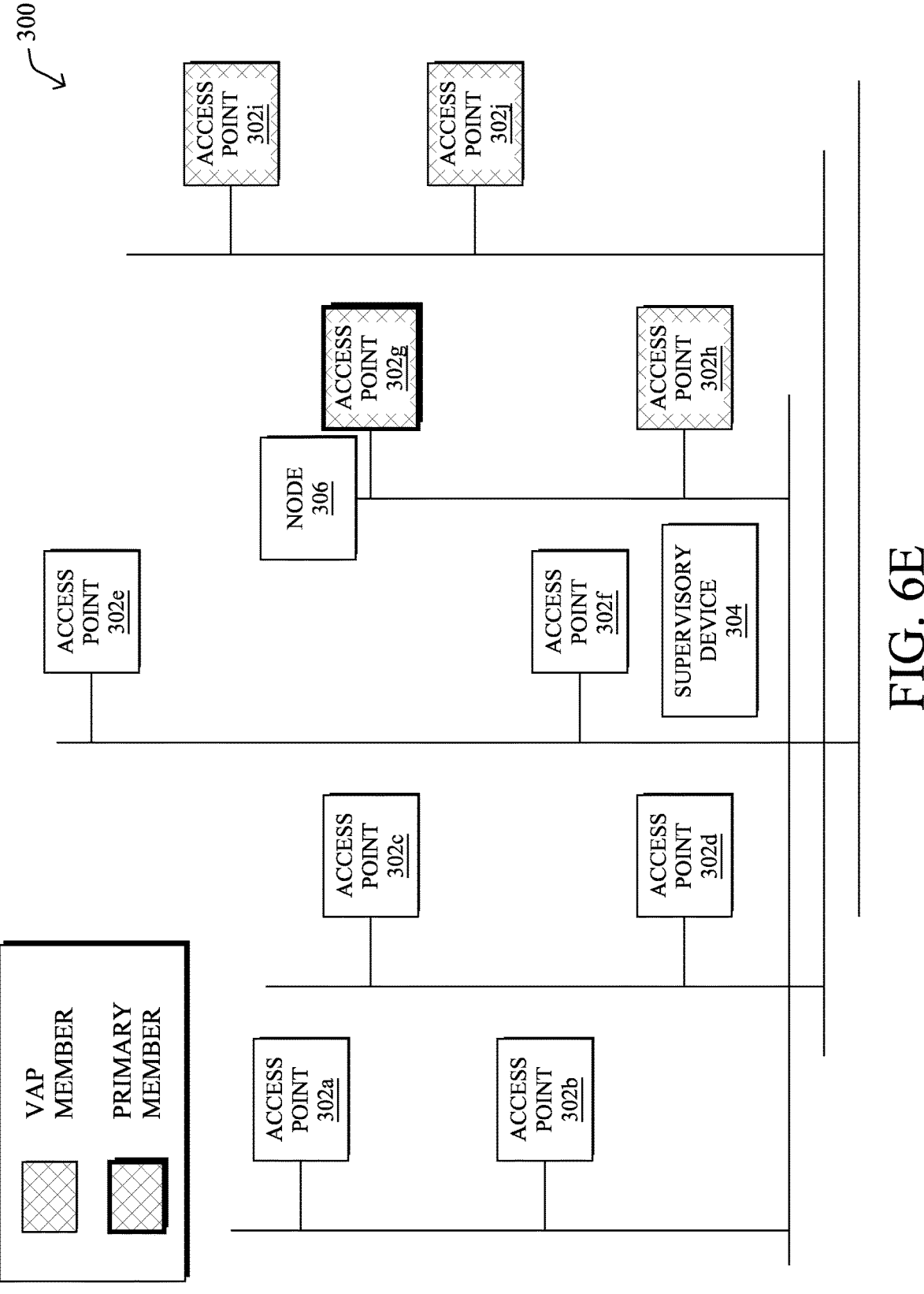

In FIG. 6D, supervisory device 304 may send VAP protocol instructions 608 to the various APs in the network, to effect the VAP configuration changes in accordance with its movement predictions for node 306. For example, AP 302c may be removed from the VAP mapping at a certain time, AP 302f may be removed from the VAP mapping at a subsequent time, etc. In addition, instructions 608 may add APs 302g-302j at the appropriate times, in advance of node 306 coming within range of the predicted location, as well as switching over the primary AP for the VAP from AP 302f to AP 302g. In doing so, when node 306 reaches its predicted location, as shown in FIG. 6E, it will not resort to roaming, as the APs that service its VAP also change.

Figure 7A:
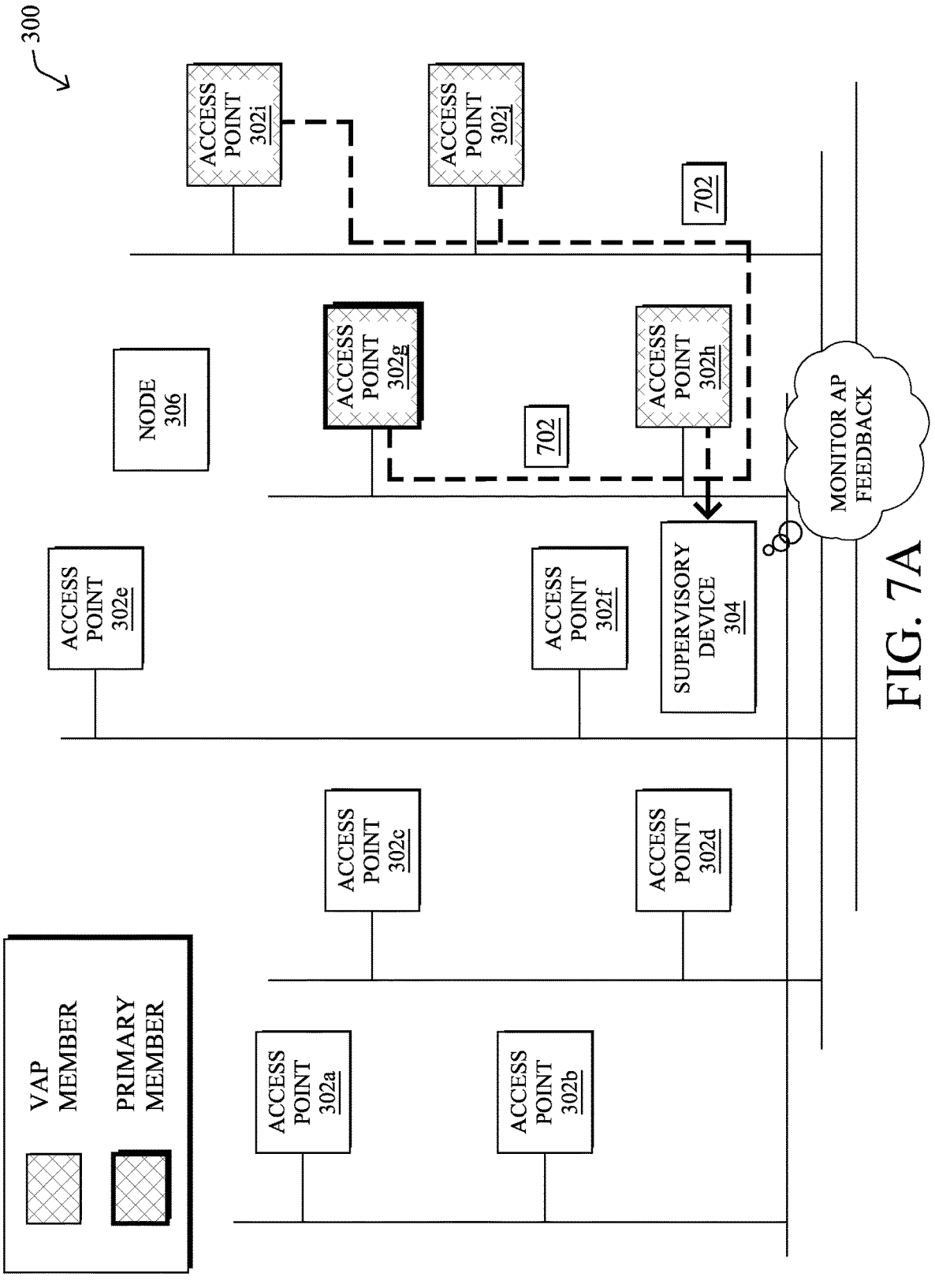
FIGS. 7A-7B illustrate an example of using feedback to adjust predictions.
Figure 7B:
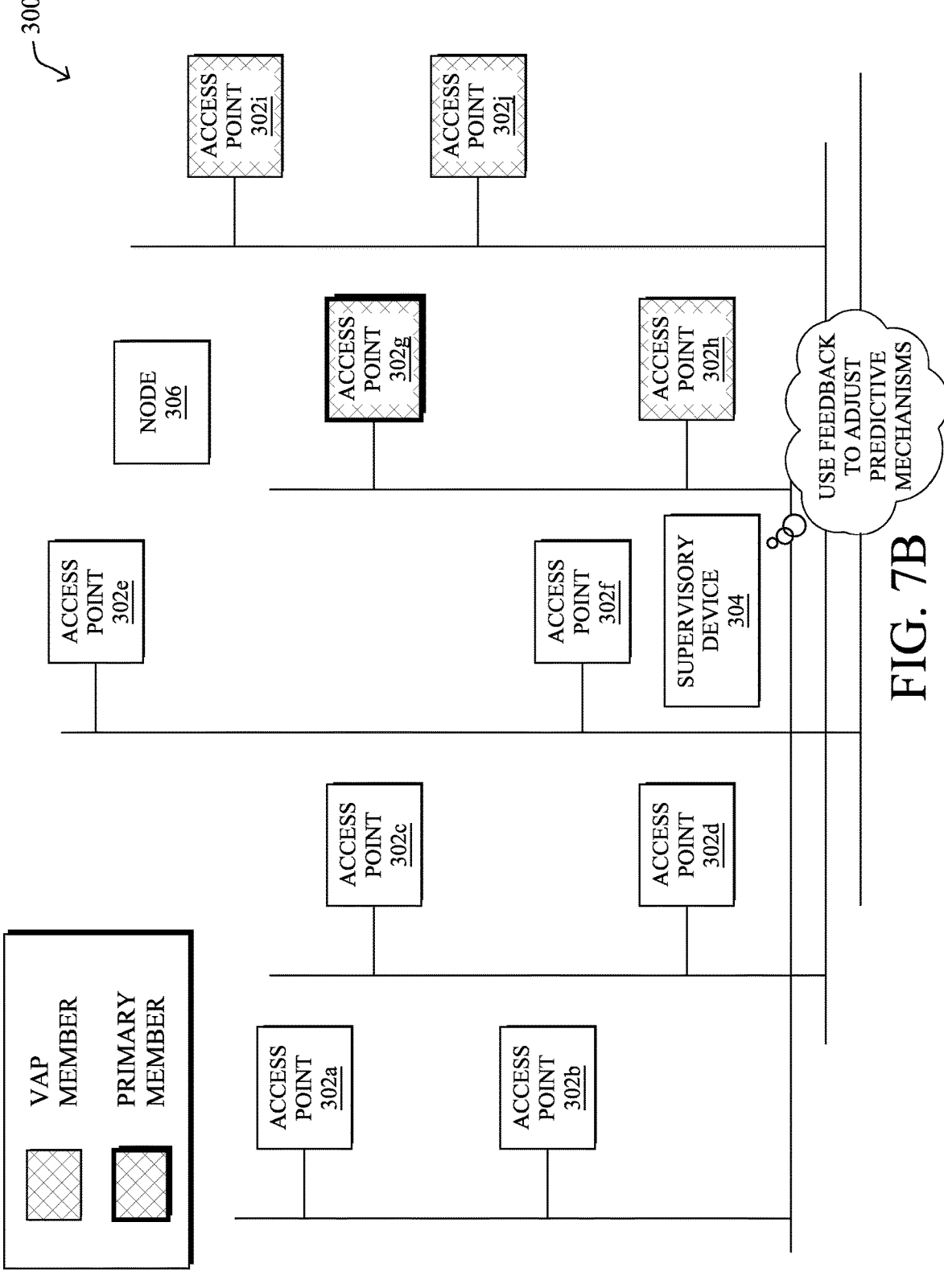

FIGS. 7A-7B illustrate an example of using feedback to adjust predictions. In networks such as Wi-Fi, it is the endpoint node that makes the decision to roam and the algorithm used to make such a decision is left to the node itself. As a matter of fact, strategies do vary between vendors of end devices. In some cases, roaming strategies may be simple and conservative (e.g., roam when the RSSI<−70 dB). In other cases, more sophisticated approaches are taken by considering multiple parameters and are sometimes fairly sensitive, in an attempt to constantly select the best AP according to a set of given metrics.

Consequently, the LM making the predictions regarding the optimal VAP configurations for node 306 may need to be adapted on a per node basis. In one embodiment, the LM could be notified of the roaming strategy of node 306, so as to adapt the AP prediction model. In other embodiments, the LM may make use of different predicting AP models according to the node type, or the node type may be a feature of the same model.

As shown in FIG. 7A, supervisory device 304 may receive feedback 702 from the APs 302 regarding its predictive models. For example, if node 306 is located at a different location than the predicted location, this information can be used to update the location predictive model. Similarly, if node 306 roams to another AP, that AP may send a custom VAP protocol message to supervisory device 304 to indicate this roaming.

Upon receiving the roaming notification feedback, as shown in FIG. 7B, the LM will deduce that the prediction strategy has failed (e.g., the predicted AP is incorrect and thus the node has roamed despite the attempt of the LM to find the best strategy). Such feedback is a quite powerful message for the LM so as to determine the overall efficiency of the system and trigger a relearning of the predictor, without any user intervention.

Figure 8:
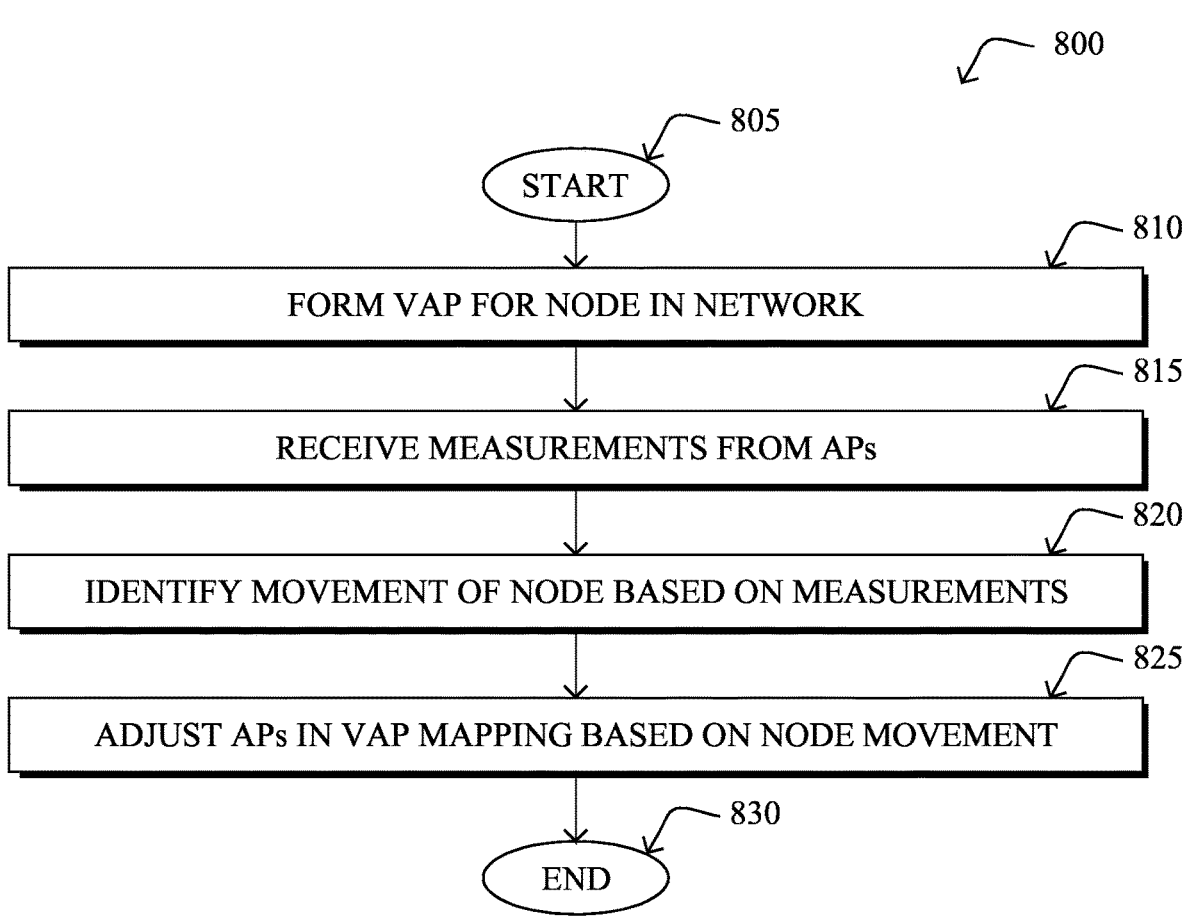
FIG. 8 illustrates an example simplified procedure for performing transparent roaming in a VAP.

FIG. 8 illustrates an example simplified procedure for performing transparent roaming in a VAP, according to various embodiments. For example, a non-generic, specifi-cally configured device (e.g., device 200) may perform procedure 800 by executing stored instructions (e.g., process 248). Such a device may be, in some embodiments, a supervisory device such as a wireless controller in the network that oversees a plurality of APs in the network or, in further embodiments, a collection of one or more APs or a cloud-based service. The procedure 800 may start at step 805 and continue on to step 810 where, as described in greater detail above, the device may form a virtual access point (VAP) in the network for the node. A plurality of access points (APs) in the network are mapped to the VAP and the APs in the VAP mapping are treated as a single AP by the node for communicating with the network.

At step 815, as detailed above, the device may receive measurements from the APs in the VAP mapping regarding communications associated with the node. For example, such measurements may include indications of the wireless signal quality, signal strength, or the like (e.g., RSSI values, LQI values, SNR values, etc.). In some embodiments, the device may vary the APs in the VAP mapping, as needed, to obtain test measurements from any number of other APs in the network. For example, as the node physically moves, it may come within reach of other APs.

At step 820, the device may identify a movement of the node based on the received measurements from step 815, as described in greater detail above. In some embodiments, the device may use time different of arrival (TDOA) techniques, to compare the communications associated with the node, as received by the various APs, to determine the location of the node. In further embodiments, the device may receive scheduling information (e.g., from a room reservation sys-tem, a calendaring system, etc.), to determine a location of a user associated with the node.

At step 825, as detailed above, the device may adjust the APs in the VAP mapping of the node's VAP based on the identified movement of the node. In various embodiments, the device may use machine learning to predict future locations of the node and/or predict the optimal set of APs in the VAP mapping for that future location. For example, the model may take into account the romancing criteria used by the node, so as to select a set of APs that will prevent the node from roaming as it nears its predicted future location. Procedure 800 then ends at step 830.

It should be noted that while certain steps within proce-dure 800 may be optional as described above, the steps shown in FIG. 8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide trans-parent roaming in a VAP-enabled network. In particular, the techniques herein, allows the infrastructure to optimize the coverage for a moving node, resulting in more deterministic operations since the node never needs to roam and there is no service interruption when the set of APs changes (trans-parently to the node).

———Mobile Nodes with VAP Awareness———

While the techniques introduced above are backwards compatible for existing mobile nodes in that the VAP operations are performed by the wireless networking infrastructure itself so as to make the VAP operations completely transparent from the standpoint of the mobile node, a further insight herein is that introducing at least some awareness of the VAP to the mobile node allows for further optimization of the network. In some aspects, the techniques herein also introduce signaling mechanisms to alert the mobile node as to the availability of a VAP. Doing so allows for actions such as the mobile node indicating its application and/or traffic profiles to the infrastructure, thereby allowing for a more optimal VAP selection to support the mobile node.

Illustratively, the techniques described herein may be performed by hardware, software, and/or firmware, such as in accordance with virtual access point process 248, which may include computer executable instructions executed by processor 220 (or independent processor of interfaces 210) to perform functions relating to the techniques described herein. In particular, VAP process 248 may be a component of an IoT device, a cloud device, or any other participating device for the techniques described herein.

As would be appreciated, access points traditionally have operated on non-overlapping channels and any given node is served by a single access point at any given point in time. Doing so creates a single point of failure with respect to losses. In addition, handover latency and failures can add close to approximately forty milliseconds to upwards of five seconds, based on the radio frequency (RF) conditions, layout, software capabilities of the node, and the like.

According to various embodiments, the VAP techniques herein can also be leveraged to form RF coverage "super cells" whereby multiple access points all operate on the same frequency or set of frequencies at any given time. To illustrate the teachings herein, FIGS. 9A-9D illustrate examples of the use of a radio frequency (RF) super cell to support a VAP.

As shown in example 900 in FIG. 9A, again consider the case in which a supervisory device 304 (e.g., a WLAN controller, etc.) configures a VAP 902 across any number of access points 302, such as access point 302a and access point 302b shown. In some embodiments, in doing so, supervisory device 304 may configure access point 302a and access point 302b to operate on the same set of one or more frequencies/wireless channels, so as to function as a super cell. This can be done, for instance, by supervisory device 304 configuring channel hopping schedules on each of the access points in VAP 902 in which at least some of the time slots use a common channel for use to communicate with a node associated with VAP 902, such as node 306 shown.

One key advantage of configuring a super cell in con-junction with VAP 902 is that the RF coverage of VAP 902 is greatly increased from that of any of its constituent access points. More specifically, while each of the access points mapped to VAP 902 may have its own RF coverage on any given channel at any given time, the access points operating on different frequencies would still require some form of handover as node 306 moves throughout the location. How-ever, by having the access points in VAP 902 operate on a common channel when communicating with node 306, no handover is required, thereby eliminating any latency that typically results from such operations. More specifically, since all of the access points in VAP 902 are operating on the same channel, the presentation of them as a singular, logical access point to node 306 means that it does not need to roam when attached to this logical access point. In addition, this also removes the potential for a single point of failure, as a packet lost between node 306 and any of the access points in VAP 902 can still be received via any of the other access points in VAP 902. In addition, use of an RF super cell for VAP 902 also provides high reliability, allowing for support of ultra-reliable low latency communications (URLLC).

Figure 9A:
FIGS. 9A-9D illustrate examples of the use of a radio frequency (RF) super cell to support a VAP.
Figure 9A:
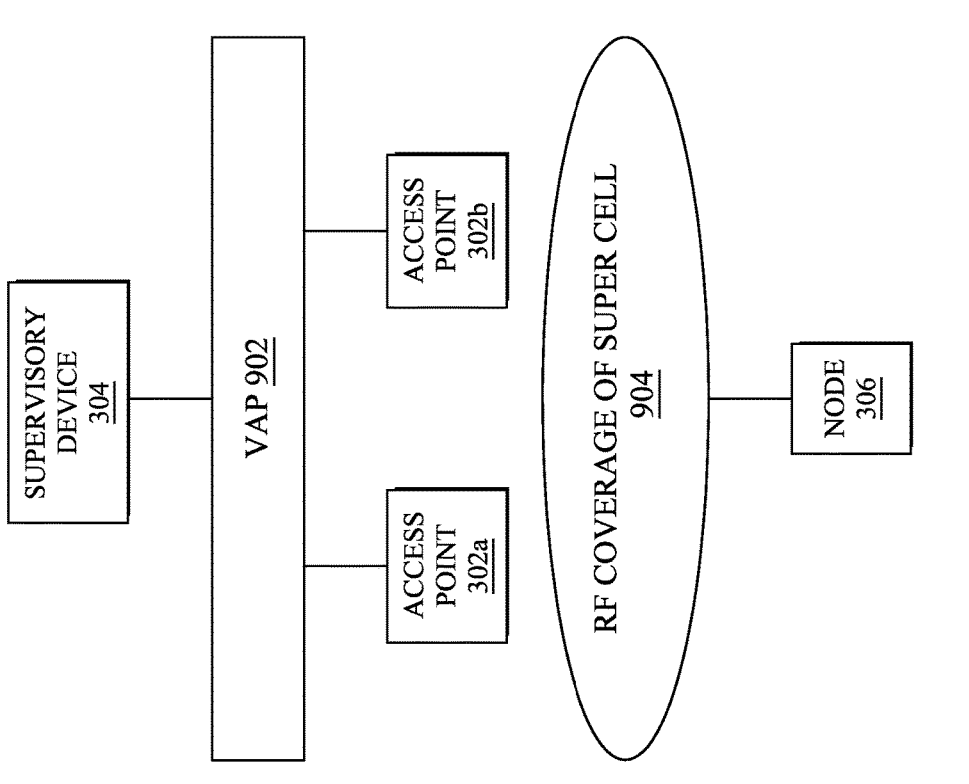
Figure 9B:
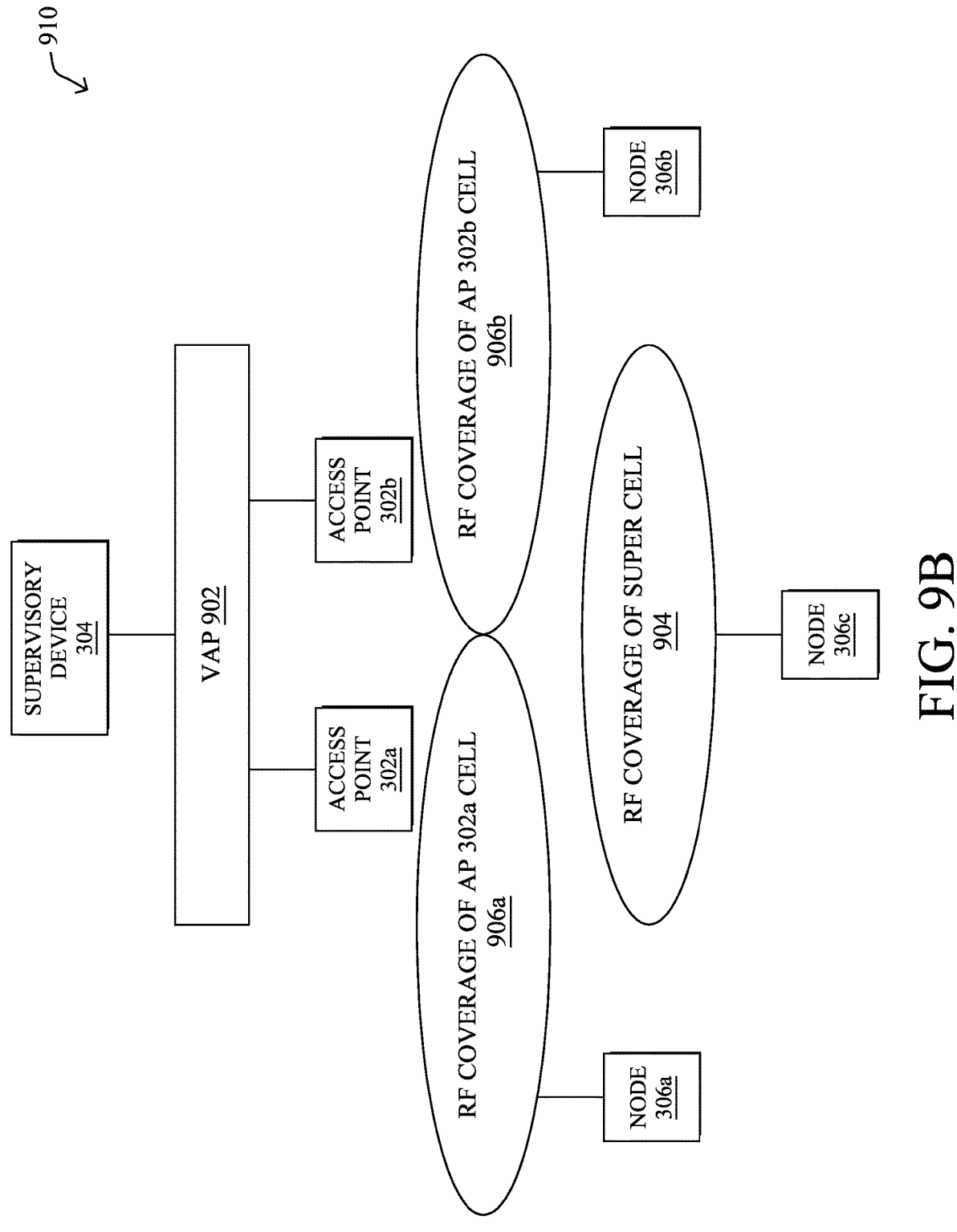

In further embodiments, as shown in example 910 in FIG. 9B, another option would be for the use of a hybrid approach that combines the use of a super cell with that of individual RF cells (e.g., on a per-access point basis). More specifically, as shown, access point 302a may operate on its own designated channels, resulting in it having its own RF cell with RF coverage 906a. Similarly, access point 302b may operate on its own designated channels, resulting in it having its own RF cell with RF coverage 906b. In addition, both access point 302a and access point 302b may operate on one or more shared channels as part of a super cell, which has RF coverage 904 that spans both of RF coverages 906a-906b. In some embodiments, the different cells (e.g., the individual cell and the super cell) for any given access point 302 may be in different bands, entirely (e.g., the 5 GHz and 6 GHz bands), or in the same band when interference can be avoided.

As shown, another potential implementation feature of a hybrid approach to RF cells would be to associate some nodes with individual cells, while others may be associated with the super cell. For instance, node 306a may use the individual RF cell of access point 302a, node 306b may use the individual RF cell of access point 302b, and node 306c may use the RF super cell shared by access point 302a and access point 302b. To do so, for instance, node 306c may form an association with VAP 902 and communicate via the RF super cell supported by both access points. Note that the individual cells of access point 302a and access point 302b may also have their own corresponding VAPs or may simply be implemented through standard wireless techniques.

Figure 9D:
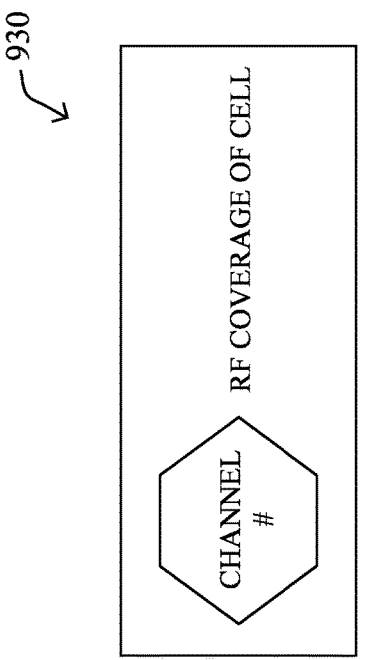
Figure 9D:
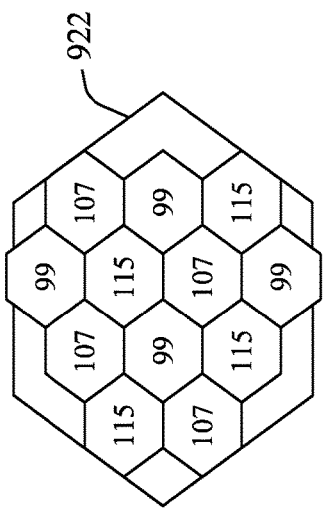
Figure 9C:
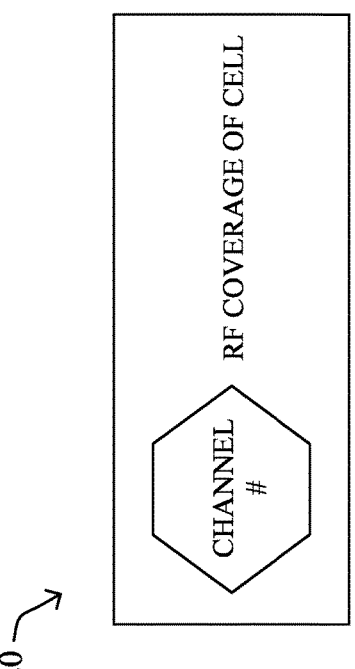
Figure 9C:
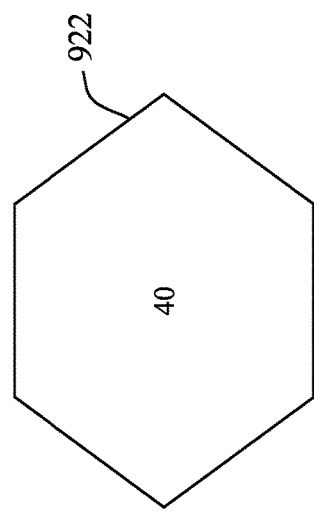

FIGS. 9C-9D illustrate example 920 and example 930, respectively, showing the super cell and hybrid super cell approaches, in some embodiments. As shown in FIG. 9C, a super cell 922 may operate on a channel shared by its corresponding access points, such as wireless channel "40." In doing so, its coverage area may be comparatively large with respect to those potentially offered by its constituent access points.

FIG. 9D shows the use of a hybrid approach whereby super cell 922 is formed and used, in addition to the individual RF cells of its constituent access points. As shown, these individual cells may operate on their own channels that are separate from that of super cell 922. For instance, while super cell 922 operates at a particular point in time on channel '40,' the individual RF cells of its access points may operate on channels '99,' '107,' and '115.' Note that some of the channels used by the individual RF cells may also be common across multiple access points, as well, such as when they are spatially separated and would not cause interference with one another. Coordination and scheduling of the different RF cells could be achieved either centrally (e.g., by supervisory device 304) or in a distributed manner (e.g., by the constituent access points 302).

In further embodiments, by making a node VAP-aware, this now affords the possibility of the network providing VAPs as a service to any given node, to better optimize the VAP(s) for a given node to its individual needs. Thus, not only is it possible for the network to better select the set of access points for a VAP to be used by the node, but can also assign VAPs to different nodes and/or flows of the node, as well as optimally assign the VAPs to RF cells, in accordance with the teachings above.

Figure 10A:
FIGS. 10A-10C illustrate an example of a VAP-aware node associating with a VAP.
Figure 10A:
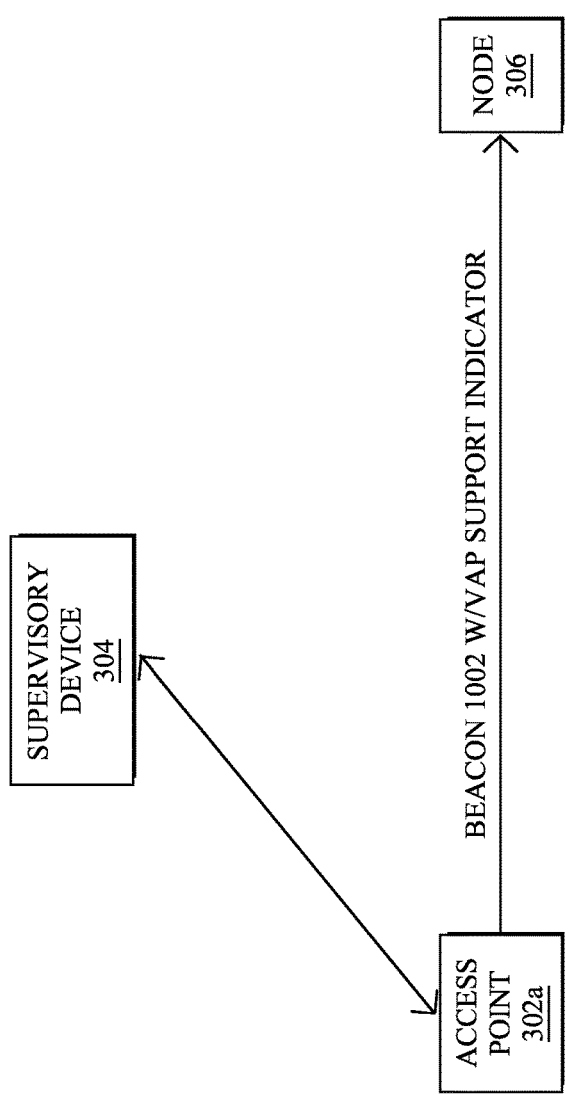
Figure 10B:
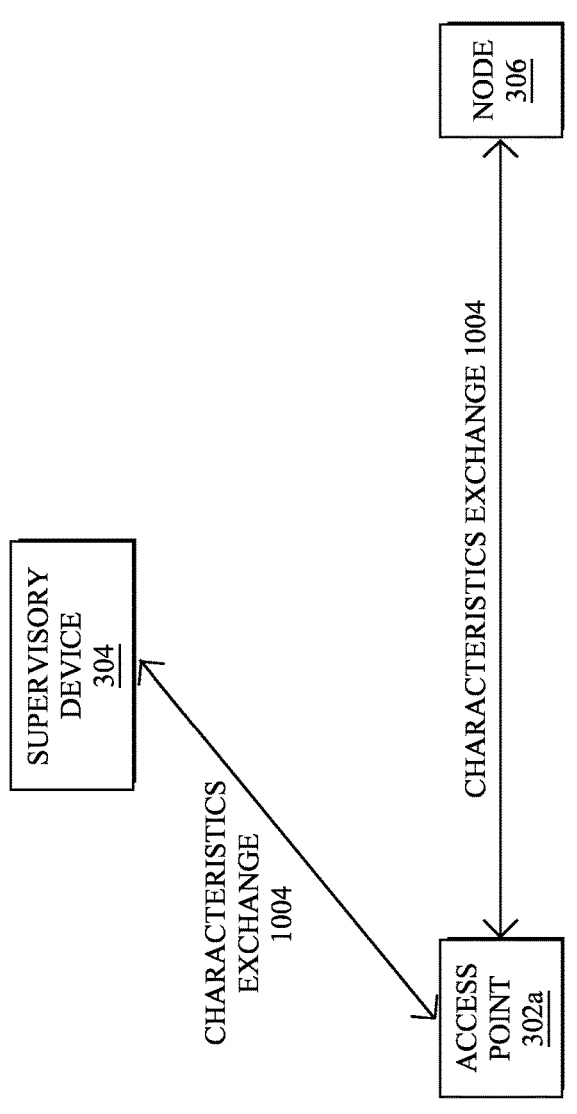
Figure 10C:
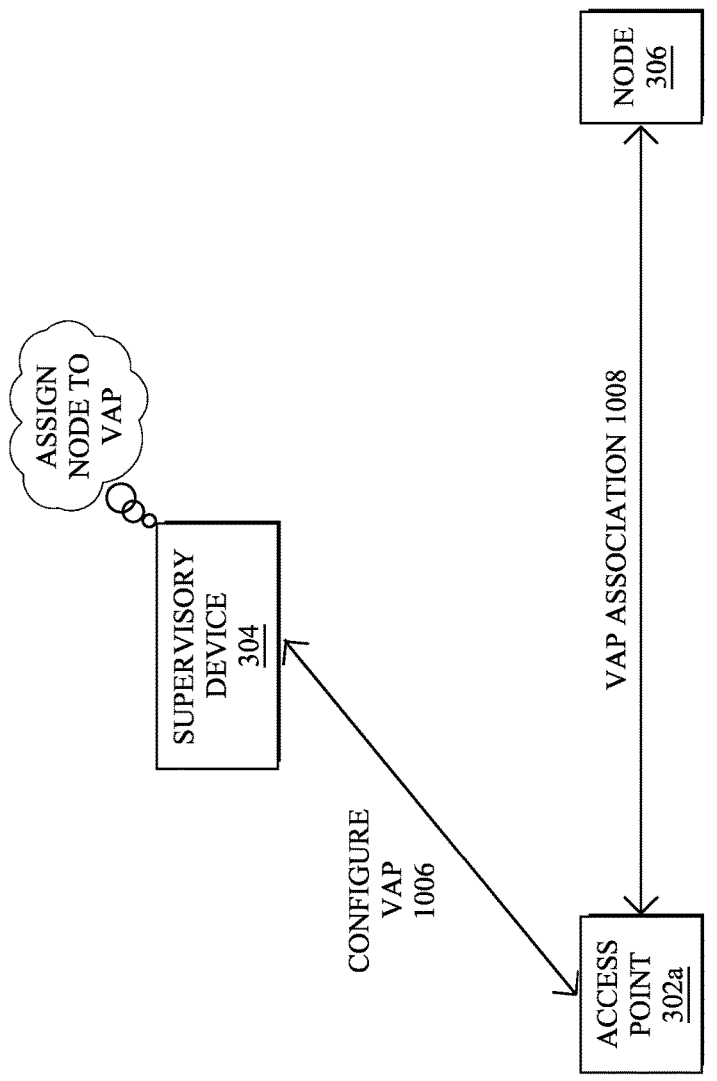

FIGS. 10A-10C illustrate an example of a VAP-aware node associating with a VAP, according to various embodiments. As shown in example 1000 in FIG. 10A, again consider the case of a node 306 being located within range of an access point 302a whose configuration is controlled by supervisory device 304. In contrast to fully transparent VAP operations in which node 306 is completely unaware that it is interacting with a VAP, the techniques herein further propose that node 306 has at least some functionality to participate more actively in the VAP formation process. Indeed, by exposing VAP capabilities as a service to the node, the VAP may locally make decisions such as selecting whether to use a VAP mode or non-VAP mode, potentially even switching between the two based on its needs.

In some embodiments, the infrastructure of the wireless network may notify node 306 of an ability of the network to support virtual access points. For instance, if supervisory device 304 is able to configure the use of VAPs in the network, it may instruct access point 302a to indicate support of VAP in its beacons or other messages to the nodes seeking to join the network. For instance, as shown, access point 302a may send a beacon 1002 (e.g., an 802.11 beacon) with an indication that the network supports the formation and use of VAPs, thereby notifying node 306 that it can leverage the VAP capabilities of the network. In some embodiments, beacon 1002 or another message from access point 302a may also indicate the capabilities of any VAP available to be formed in the network for node 306, such as it offering redundant paths, support for deterministic networking (e.g., traffic guaranteed to be delivered within a bounded time), or the like. In a further embodiment, a Bloom filter could be used as part of beacon 1002 to indicate the existence of a larger number of VAPs available (e.g., >16), BSS coloring, or the like.

As shown in FIG. 10B, node 306 may perform an exchange 1004 with access point 302a (and, consequently, supervisory device 304), to provide node 306 and/or access point 302a enough information so as to optimize the formation of one or more VAPs to service node 306. In some embodiments, at least a portion of exchange 1004 may be conducted using the access network query protocol (ANQP) or generic advertisement service (GAS). Regardless, the overall purpose of exchange 1004 is to convey information regarding the needs of node 306 to supervisory device 304, so that it can select and configure an appropriate set of access points for the VAP(s) for node 306.

In some embodiments, as part of exchange 1004, node 306 may indicate any or all of the following to supervisory device 304:

The set of one or more applications whose traffic is to be conveyed to/from node 306 by the network. In some instances, node 306 could advertise its application TXOP, so that the VAP is placed on the right channel.

The traffic profile of node 306.

A requested number of access points for inclusion in the VAP for node 306 generally, on a per-application basis, or even on a per-flow basis.

Information regarding the beacon(s) that node 306 received (e.g., from access point 302a or any other access points 302.

A selected BSSID of a preferred access point 302. In such a case, supervisory device 304 could make that access point the primary access point in the VAP, for instance.

Etc.

As shown in FIG. 10C, supervisory device 304 may use the information that it obtains via exchange 1004 to select a plurality of access points 302, such as access point 302a, for inclusion in the VAP for node 306. For instance, supervisory device 304 may perform a VAP configuration 1006 with access point 302a that instructs it to participate in the VAP for node 306. In various embodiments, VAP configuration 1006 may, for instance, configure access point 302a with a communication schedule (e.g., a channel hopping schedule) that configures it to communicate with node 306 on a specified set of one or more channels.

In some embodiments, the same VAP could be configured on multiple channels, to use multi-link operation (MLO), a common acknowledgement (ACK), coding variants, or the like. In another embodiment, the configured VAP could also be a multicast VAP having a MAC address computed based on the MAC address or other identifier of node 306. In a further embodiment, a randomized and changing MAC (RCM) could also be used (e.g., derived from the MAC address of node 306 or another identifier). In yet another embodiment, the real MAC address of access point 302a could also be used to broadcast the SSID(s).

In one embodiment, VAP configuration 1006 may configure access point 302a with a set of one or more utilities for purposes of processing traffic associated with node 306. Such utilities could also be executed in a dedicated container executed by access point 302a, in some instances. For example, the utilities could be used to control on a per-flow or per-application basis how the VAP handles traffic associated with node 306. By way of example, assume that the access points 302 have enough resources to provide the entire bandwidth of antennas to multiple containers, each of which is running a separate access point instance (e.g., one for each channel or set of channels). In such a case, the network could instantiate the best software for each node, making the VAP BSSID served by an access point container. There could also be different versions for different vendors (e.g., Apple, Samsung, etc.), each of which has different capabilities, as well. Doing so allows for an even more tailored service and helps to reduce backwards compatibility issues. In some embodiments, the services offered by the access points and/or the network infrastructure itself could also include device classification services that could help to identify the specific type of node 306, either with or without its participation. In a further embodiment, a single SSID could also be used across multiple tenants, each with its own PSK. In such a case, the network may identify (from the 4-way handshake) which PSK is used.

In further embodiments, different BSSIDs could also be configured, depending on the applications in use by node 306, as well. In another embodiment, VAP configuration 1006 may also configure access point 302a to use a specified data rate or set of data rates for the traffic of node 306 (e.g., through the configuration of a modulation coding scheme (MCS) parameter, or the like).

Once access point 302a and the other access points in the VAP are configured, node 306 may form an association 1008 with it, thereby allowing it to communicate with the network via the VAP. In some cases, node 306 may include flow-level information in its frames to the VAP, to then signal to the VAP information such as how many APs should be used to support that flow, such as based on the quality of service (QoS) needs of that flow. Conversely, access point 302a and the other access points in the VAP may instead perform analysis of the flow, to decide which of them are to support that flow, dynamically.

In some embodiments, the configured VAP may also provide AP diversity in the packet transmissions associated with node 306. In such a case, node 306 may expect more than one ACK from access point 302a and its cohorts. In addition, node 306 may add a sequence number to its transmissions, which may be translated into Time Sensitive Networking (TSN) format or transported in CAPWAP. If a given access point in the VAP then did not receive an ACK from node 306, it may probe node 306 for the sequence. More specifically, consider the case in which access point 302a sends downlink traffic to node 306 via the VAP (e.g., with a certain sequence) and that access point 302b is ready to re-send this traffic for the same frame/sequence. If access point 302b does not receive an acknowledgement sent by node 306 in response to the traffic from access point 302a, access point 302b could send a simple probe to node 306, to obtain the status of this traffic (e.g., was it lost or received?), before resending the traffic to node 306.

In some embodiments, node 306 may also be configured with multiple radios, allowing it to transmit and receive on different channels/frequencies at the same time. This allows for MLO operations whereby it can send or receive traffic on multiple frequencies to the same BSSID (e.g., that of the VAP) and reserve only one of these channels for acknowledgements. Of course, a non-MLO mode could also be used, whereby it still sends and receives traffic on multiple frequencies by channel hopping (e.g., for retries).

As node 306 moves its physical location over time, various possibilities also exist with respect to the BSSID:
1.) The BSSID of node 306 may be moved by the network across a set of access points 302 to support it. In such a case, the network may inform node 306 as to which channels/frequencies to use that those access points can provide.
2.) Node 306 could also scan for the availability of its BSS across different channels and selects the 'best' for itself.

In either of the above cases, the network could make sure that the security context and sessions for node 306 are following the VAP instantiation.

If node 306 uses the same BSSID when it changes its MAC address (e.g., using RCM), then privacy could be compromised. In such a case, both MAC addresses could be changed at the same time (the client and BSSID) when the RCM event occurs. This could be agreed upon between the network and node 306, accordingly.

In yet another embodiment, there may be a single broadcast BSSID or multiple broadcast BSSIDs from which node 306 opt to receive transmissions. If multiple ones are present, these could follow the location of node 306 and can be 'subscribed to' for use for different types of streams, similar to how multicast is used at the IP layer.

In yet another embodiment, node 306 may also be able to reserve or 'freeze' its BSSID, so that it is not reused by another node, when it gets disconnected and reconnects. In an extension of this, the security context for node 306 could also be frozen so that it does not have to also perform a 4-way handshake when reconnecting, thereby treating it as if it were asleep, instead. The security context could also be stored in the network and/or by node 306 (e.g., as a cookie).

Figure 11:
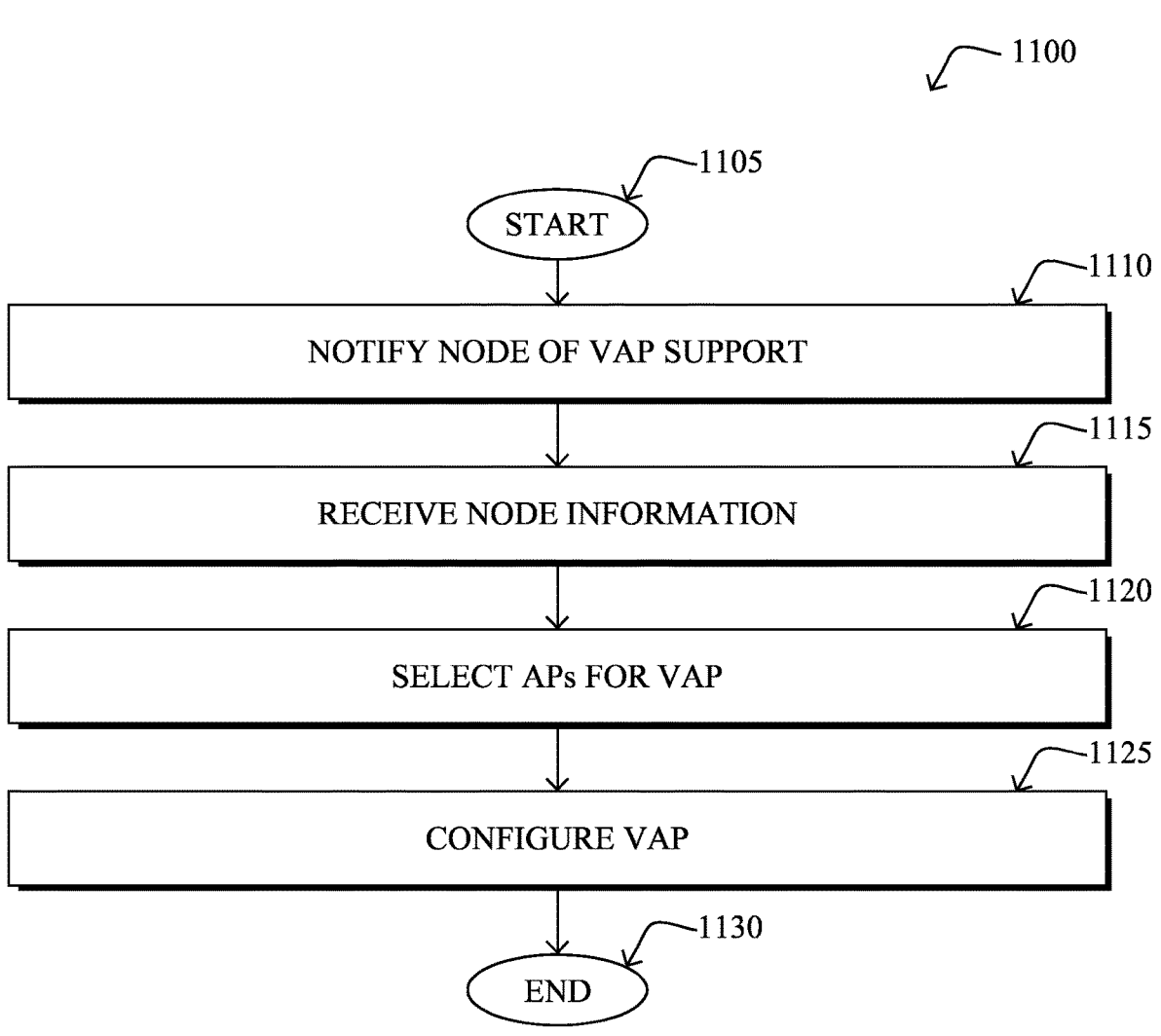
FIG. 11 illustrates an example simplified procedure for configuring a VAP for a VAP-aware node.

FIG. 11 illustrates an example simplified procedure for configuring a VAP for a VAP-aware node, according to various embodiments. For example, a non-generic, specifically configured device (e.g., device 200) may perform procedure 1100 by executing stored instructions (e.g., process 248). Such a device may be, in some embodiments, a supervisory device such as a wireless controller in the network that oversees a plurality of APs in the network or, in further embodiments, a collection of one or more APs or a cloud-based service. The procedure 1100 may start at step 1105 and continue on to step 1110 where, as described in greater detail above, the supervisory device may notify, via an access point, a node as to an ability of the network to support virtual access point. For instance, the supervisory device may instruct or otherwise configure the access point to indicate that the network supports the formation of virtual access points (e.g., as part of a wireless beacon sent by the access point, via another message, etc.). In some embodiments, the supervisory device may also do so by notifying the node as to an ability of the network to support virtual access points with redundant paths or bounded time delivery.

At step 1115, as detailed above, the supervisory device may receive, in response to notifying the node, information from the node regarding characteristics of the node. In one embodiment, characteristics indicate a request for a specified number of access points to be included in the virtual access point. In another embodiment, the characteristics indicate a traffic profile of the node. In a further embodiment, the characteristics indicate one or more applications whose traffic is sent by the node. In some embodiments, the characteristics of the node are indicative of which beacons are received by the node from one or more of the plurality of access points. In additional embodiments, the characteristics indicate a particular one of the plurality of access points selected by the node. In some embodiments, the node comprises two or more radios that communicate on two or more wireless channels associated with the virtual access point.

At step 1120, the supervisory device may select, based on the characteristics of the node, a plurality of access points in the network to form a virtual access point with which the node may communicate, as described in greater detail above.

At step 1125, as detailed above, the supervisory device may configure the plurality of access points to function as the virtual access point, wherein the node communicates with the network via the virtual access point. In various embodiments, the supervisory device may do so by assigning the plurality of access points to a common wireless channel, to form a wireless super cell associated with the virtual access point. In some embodiments, the supervisory device configures the plurality of access points to use a selected data rate when communicating with the node via the virtual access point. In one embodiment, the supervisory device may configure the plurality in part by synchronizing down link schedules associated with the node. In MLO mode, of course, the downstream could also be retried on a different channel. In some embodiments, the configuring may entail configuring the plurality of access points to use software containers dedicated to the node.

Procedure 1100 then ends at step 1130.

While there have been shown and described illustrative embodiments that provide techniques related to virtual access points (VAPs), it is to be understood that various other adaptations and modifications may be made within the spirit and scope of the embodiments herein. For example, while certain embodiments are described herein with respect to using certain environments, such as the IoT, other embodiments need not be limited to IoT devices. In addition, while certain protocols are shown, such as Wi-Fi, 802.15.4, LoRa, etc., other suitable protocols may be used, accordingly. For instance, while the techniques herein generally apply to a generalized CSMA/CA LLN, it should be specifically noted that the techniques can be applied to (based on) any of the standards mentioned above or known in the art. For ease of understanding (expecting the reader to be more familiar with the Wi-Fi parlance), the description above uses the term AP in the more general sense of a transceiver in a network. However, with Bluetooth LE, the central role illustratively maps to an AP, whereas the peripheral role is akin to the endpoint node. The same goes for the 802.15.4 PAN coordinator which is similar to an AP, and the full-function device (FFD) or reduced-function device (RFD) which illustratively map to an endpoint node, when 802.15.4 is used in plain hub-and-spoke (in that case a PAN ID illustratively serves as SSID). With DECT-ULE, the DECT Fixed Part is illustratively the AP, and the Portable Part is illustratively the node.

Note that some protocols on Wi-Fi networking refer to a "virtual access point" as many different things. For example, hosting several logical APs in one physical AP may be referred to as a "virtual access point", while turning a PC into an AP may also be referred to as a "virtual access point". The VAPs in this present disclosure should not be confused with the shared terminology, and is completely different in that one VAP herein is distributed over multiple physical APs, and there can be one VAP per node.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:

notifying, by a supervisory device in a network and via an access point, a node as to an ability of the network to support virtual access points;

receiving, at the supervisory device and in response to notifying the node, information from the node regarding characteristics of the node;

selecting, by the supervisory device and based on the characteristics of the node, a plurality of access points in the network to jointly form and operate as a virtual access point with which the node may communicate; and configuring, by the supervisory device, each of the plurality of access points to function together as the virtual access point, wherein the node communicates with the network via the virtual access point.

2. The method as in claim 1, wherein configuring the plurality of access points to function as the virtual access point comprises:

assigning the plurality of access points to a common wireless channel, to form a wireless super cell associated with the virtual access point.

3. The method as in claim 1, wherein the characteristics indicate a request for a specified number of access points to be included in the virtual access point.

4. The method as in claim 1, wherein the characteristics indicate a traffic profile of the node.

5. The method as in claim 1, wherein the characteristics indicate one or more applications whose traffic is sent by the node.

6. The method as in claim 1, wherein notifying the node as to an ability of the network to support virtual access points comprises:

notifying the node as to an ability of the network to support virtual access points with redundant paths or bounded time delivery.

7. The method as in claim 1, wherein the supervisory device configures the plurality of access points to use a selected data rate when communicating with the node via the virtual access point.

8. The method as in claim 1, wherein the characteristics of the node are indicative of which beacons are received by the node from one or more of the plurality of access points.

9. The method as in claim 1, wherein configuring the plurality of access points to function as the virtual access point comprises:

synchronizing down link schedules of the plurality of access points associated with the node.

10. The method as in claim 1, wherein the characteristics indicate a particular one of the plurality of access points selected by the node.

11. The method as in claim 1, wherein the node comprises two or more radios that communicate on two or more wireless channels associated with the virtual access point.

12. The method as in claim 1, wherein configuring the plurality of access points to function as the virtual access point comprises:

configuring the plurality of access points to use software containers dedicated to the node.

13. An apparatus, comprising:

one or more network interfaces to communicate with a network;

a processor coupled to the one or more network interfaces and configured to execute one or more processes; and a memory configured to store a process that is executable by the processor, the process when executed configured to:

notify, via an access point of the network, a node as to an ability of the network to support virtual access points;

receive, in response to notifying the node, information from the node regarding characteristics of the node;

select, based on the characteristics of the node, a plurality of access points in the network to jointly form and operate as a virtual access point with which the node may communicate; and configure each of the plurality of access points to function together as the virtual access point, wherein the node communicates with the network via the virtual access point.

14. The apparatus as in claim 13, wherein the apparatus configures the plurality of access points to function as the virtual access point by:

assigning the plurality of access points to a common wireless channel, to form a wireless super cell associated with the virtual access point.

15. The apparatus as in claim 13, wherein the characteristics indicate a request for a specified number of access points to be included in the virtual access point.

16. The apparatus as in claim 13, wherein the characteristics indicate at least one of: a traffic profile of the node, one or more applications whose traffic is sent by the node, which beacons are received by the node from one or more of the plurality of access points, or a particular one of the plurality of access points selected by the node.

17. The apparatus as in claim 13, wherein the apparatus notifies the node as to an ability of the network to support virtual access points by:

notifying the node as to an ability of the network to support virtual access points with redundant paths or bounded time delivery.

18. The apparatus as in claim 13, wherein the apparatus configures the plurality of access points to use a selected data rate when communicating with the node via the virtual access point.

19. The apparatus as in claim 13, wherein the apparatus configures the plurality of access points to function as the virtual access point by:

synchronizing down link schedules of the plurality of access points associated with the node.

20. A tangible, non-transitory, computer-readable medium storing program instructions that cause a supervisory device in a network to execute a process comprising:

notifying, by the supervisory device and via an access point, a node as to an ability of the network to support virtual access points;

receiving, at the supervisory device and in response to notifying the node, information from the node regarding characteristics of the node;

selecting, by the supervisory device and based on the characteristics of the node, a plurality of access points in the network to jointly form and operate as a virtual access point with which the node may communicate; and configuring, by the supervisory device, each of the plurality of access points to function together as the virtual access point, wherein the node communicates with the network via the virtual access point.

* * * * *